(12) United States Patent
Hudachek

(10) Patent No.: US 10,792,946 B2
(45) Date of Patent: *Oct. 6, 2020

(54) ILLUMINATED ASSEMBLY

(71) Applicant: Susan Francesca Hudachek, Timnath, CO (US)

(72) Inventor: Susan Francesca Hudachek, Timnath, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,094

(22) Filed: Apr. 4, 2019

(65) Prior Publication Data

US 2019/0232706 A1   Aug. 1, 2019

Related U.S. Application Data

(63) Continuation of application No. 16/169,850, filed on Oct. 24, 2018, which is a continuation-in-part of
(Continued)

(51) Int. Cl.
*B42D 3/12* (2006.01)
*F21V 33/00* (2006.01)
(Continued)

(52) U.S. Cl.
CPC ............ *B42D 3/123* (2013.01); *B42D 1/004* (2013.01); *B42D 1/007* (2013.01); *B42D 1/008* (2013.01);
(Continued)

(58) Field of Classification Search
CPC ........ B42D 3/123; B42D 1/007; B42D 1/008; F21V 33/0004
(Continued)

(56) References Cited

U.S. PATENT DOCUMENTS 3,622,771 A   11/1971   Franc
4,209,824 A    6/1980   Kaufman
(Continued)

FOREIGN PATENT DOCUMENTS

DE   10 2020 055551 A1   6/2012
EP        3044012         3/2015
(Continued)

OTHER PUBLICATIONS

Machine translation of Luecke, DE 102010055551-A1, published Jun. 28, 2012 (Year: 2012).*

(Continued)

*Primary Examiner* — William N Harris
(74) *Attorney, Agent, or Firm* — Susan F. Hudachek

(57) ABSTRACT

An illuminated assembly, and methods of making and using such an illuminated assembly, whereby the illuminated assembly includes a panel and at least one sheet coupled to the panel, the sheet capable of overlaying engagement with the panel. The sheet can include a sheet front surface opposite a sheet back surface, and at least one light transmission portion disposed therein, whereby the light transmission portion can communicate between the sheet front and back surfaces. Further, the illuminated assembly can include a light source operatively coupled to the panel, whereby in an activated condition, the light source can provide light to the panel. Following, the light can be transmitted from the panel through the light transmission portion of the sheet such that the light can be viewable by a viewer of the sheet front surface.

19 Claims, 21 Drawing Sheets

Related U.S. Application Data application No. 15/933,605, filed on Mar. 23, 2018, now Pat. No. 10,137,721, which is a continuation-in-part of application No. 14/903,578, filed as application No. PCT/US2014/055323 on Sep. 12, 2014, now Pat. No. 10,137,720.

(60) Provisional application No. 61/876,762, filed on Sep. 12, 2013.

(51) Int. Cl.
    *B42D 1/00*     (2006.01)
    *G09B 5/06*     (2006.01)
    *F21W 131/30*     (2006.01)

(52) U.S. Cl.
    CPC ............ *F21V 33/0004* (2013.01); *G09B 5/06* (2013.01); *G09B 5/062* (2013.01); *B42P 2241/16* (2013.01); *F21W 2131/3005* (2013.01)

(58) Field of Classification Search
    USPC .......................................................... 362/98
    See application file for complete search history.

(56) References Cited

U.S. PATENT DOCUMENTS

| | | | |
|---|---|---|---|
| 4,363,081 A | 12/1982 | Wilbur | |
| 5,118,138 A | 6/1992 | Brotz | |
| 5,167,508 A | 12/1992 | Mc Taggart | |
| 5,301,982 A | 4/1994 | Brotz | |
| 5,381,310 A | 1/1995 | Brotz | |
| 5,460,414 A | 10/1995 | Sargis | |
| 6,805,459 B1* | 10/2004 | Prescott | B42D 3/123 362/98 |
| 6,951,403 B2 | 10/2005 | Bennett | |
| 7,178,928 B2* | 2/2007 | Tsai | G02B 6/0083 362/98 |
| 7,490,948 B2 | 2/2009 | Fisherman et al. | |
| 7,656,580 B2 | 2/2010 | Chang | |
| 8,087,794 B2 | 1/2012 | Stravinskas et al. | |
| 10,137,721 B2 | 8/2018 | Hudachek | |
| 10,137,720 B2 | 11/2018 | Hudachek | |
| 2006/0066094 A1* | 3/2006 | Piomboni | B42D 3/123 281/29 |
| 2008/0310143 A1* | 12/2008 | Barker | F21S 6/002 362/98 |
| 2016/0159133 A1 | 6/2016 | Hudachek | |
| 2018/0215186 A1 | 8/2018 | Hudachek | |
| 2019/0054753 A1 | 2/2019 | Hudachek | |

FOREIGN PATENT DOCUMENTS

| | | |
|---|---|---|
| GB | 2 474 583 A | 4/2011 |
| WO | 2015038857 | 3/2015 |

OTHER PUBLICATIONS

Extended European Search Report for corresponding EPO Patent Application No. 14844578.6; 8 pages total.
International Search Report (ISR) for corresponding PCT International Patent Application No. PCT/US2014/055323; ISR=2 total pages.
Written Opinion (WO) for corresponding PCT International Patent Application No. PCT/US2014/055323; WO=6 total pages.
Lite the Nite Books Website, Oct. 6, 2016. Website, http://www.litethenitebooks.com/.
Zach Honig, Wired's LED-powered Moto X ad lets you try custom colors before you buy; https://www.engadget.com/2013/12/19/moto-x-wired/; page captured on Feb. 22, 2017.
DK, Good Night, Baby Moon, Book, DK Children, published Sep. 5, 2017. Website, https://www.dk.com/us/9781465463074-good-night-baby-moon/.

\* cited by examiner

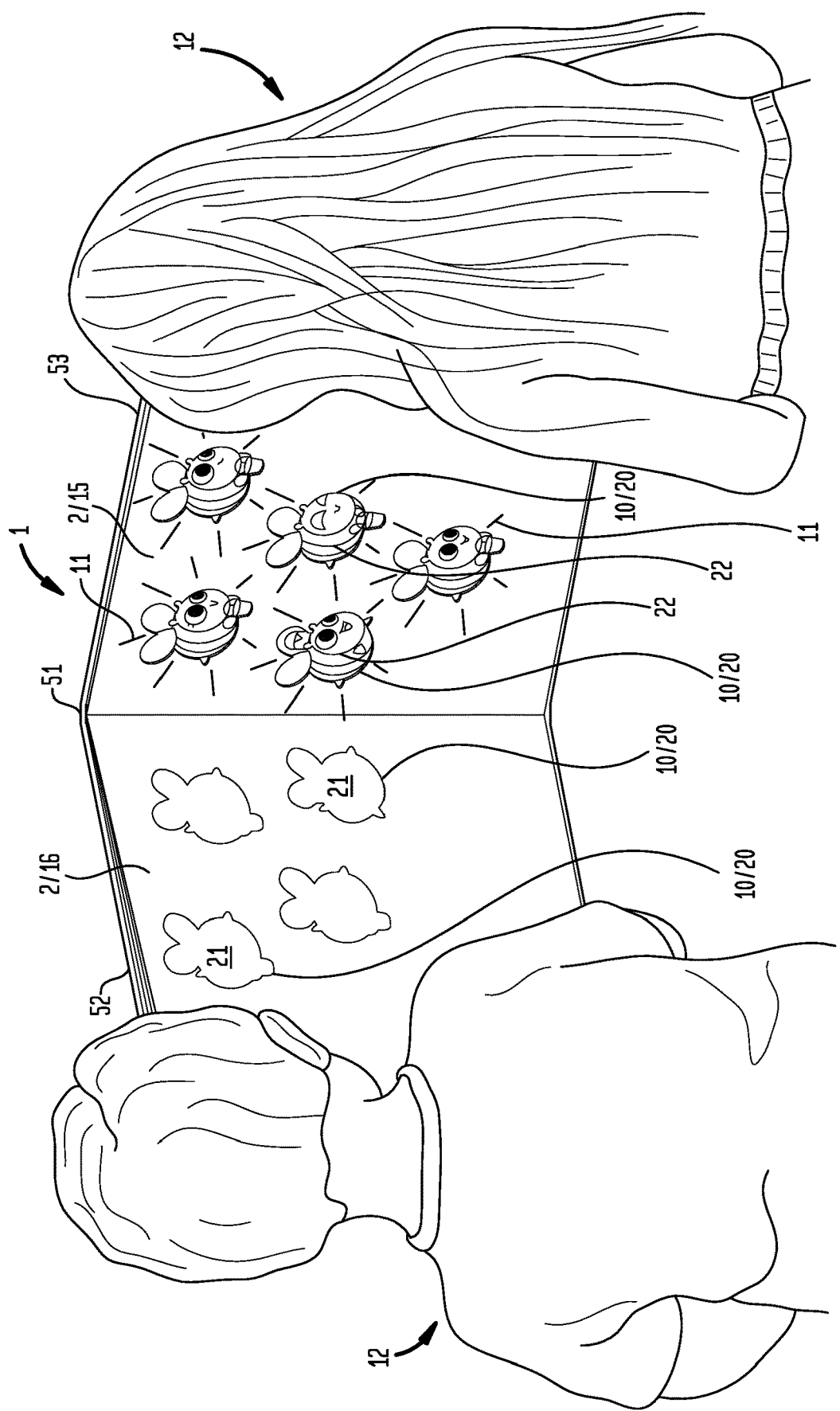

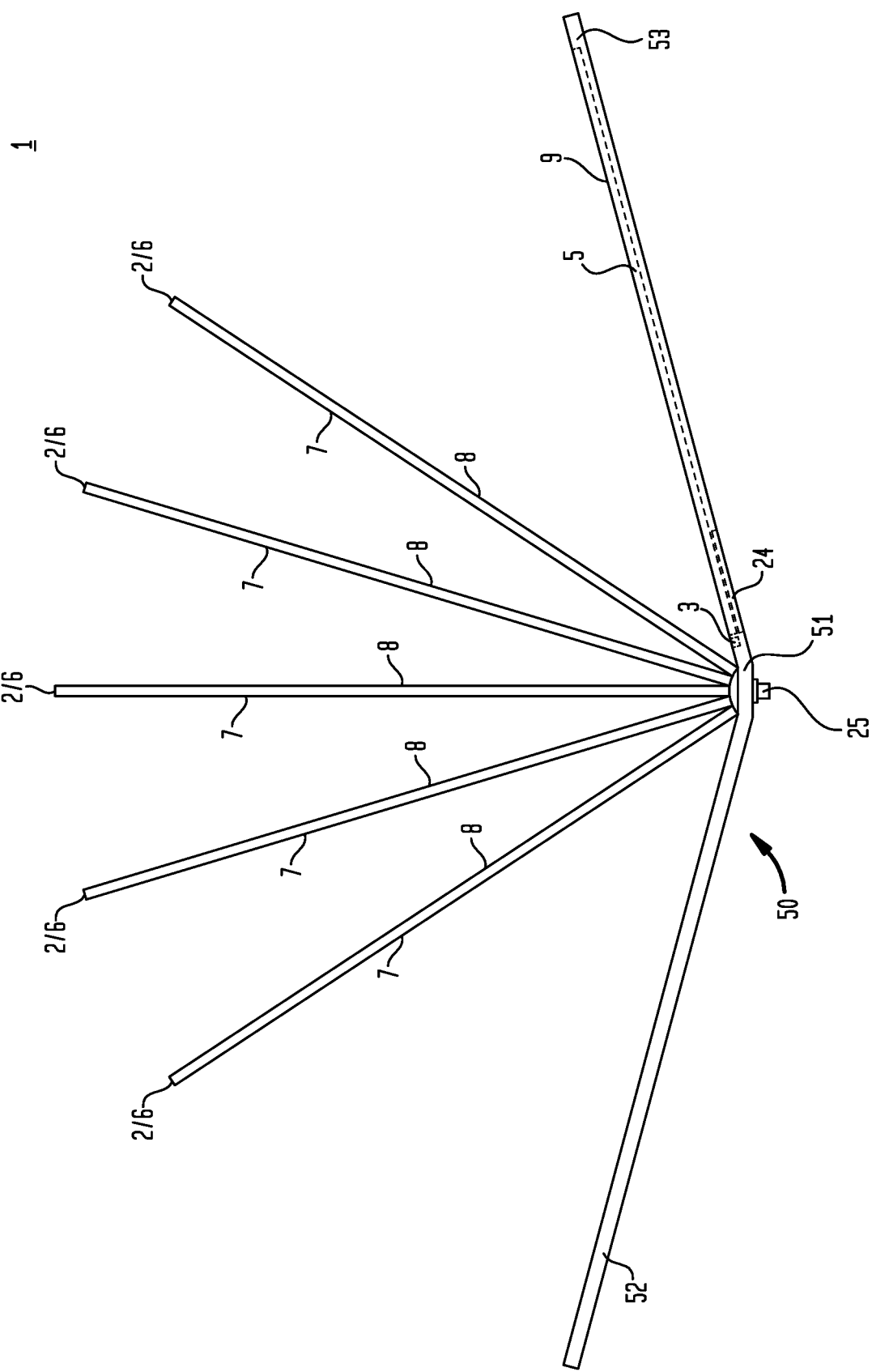

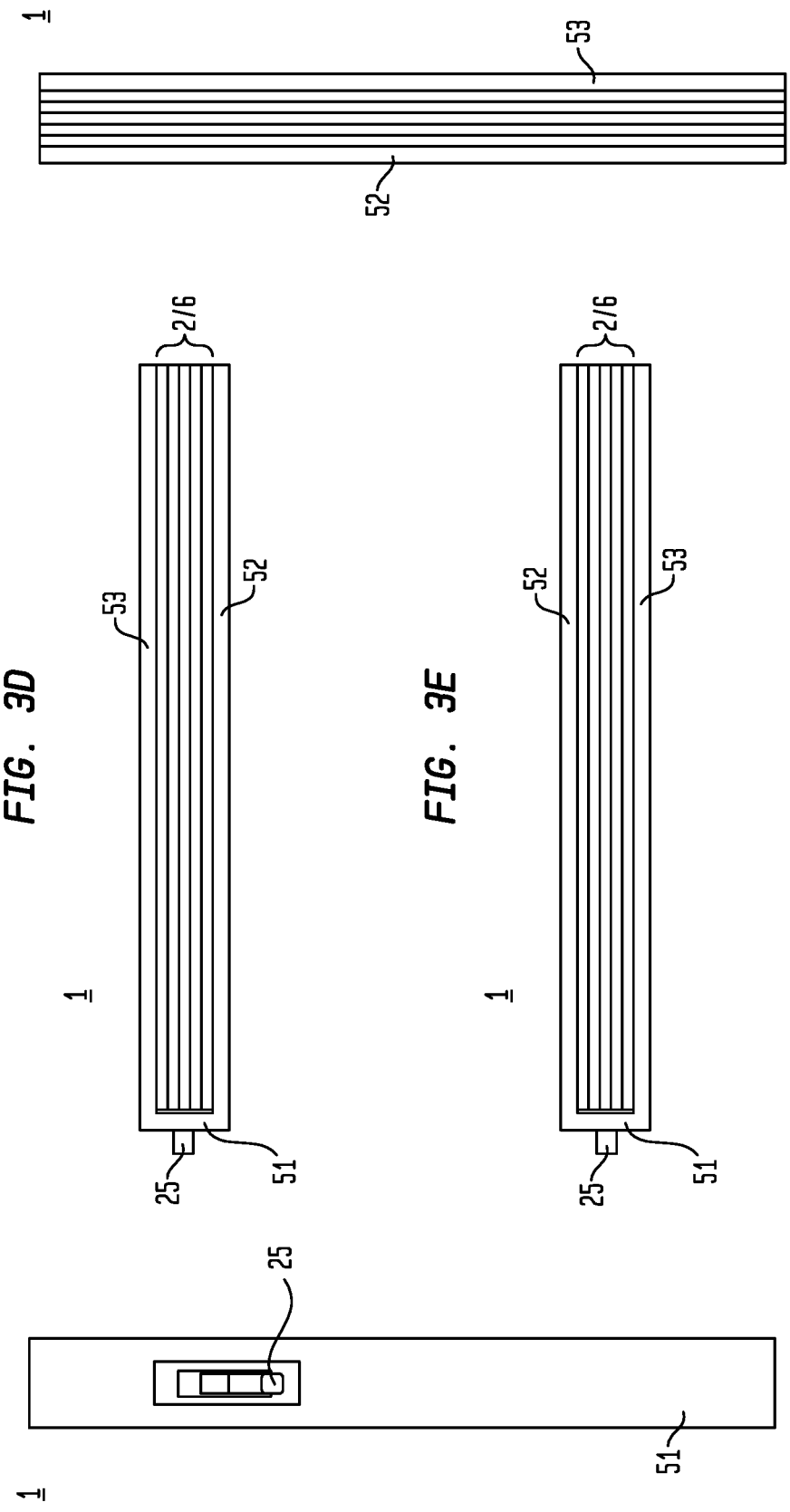

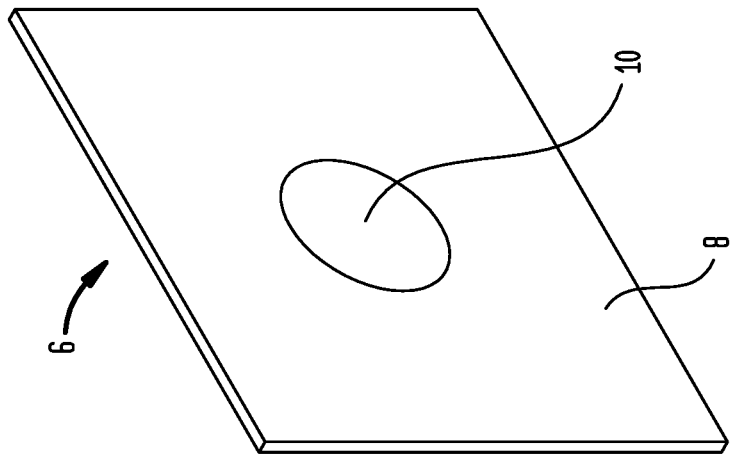
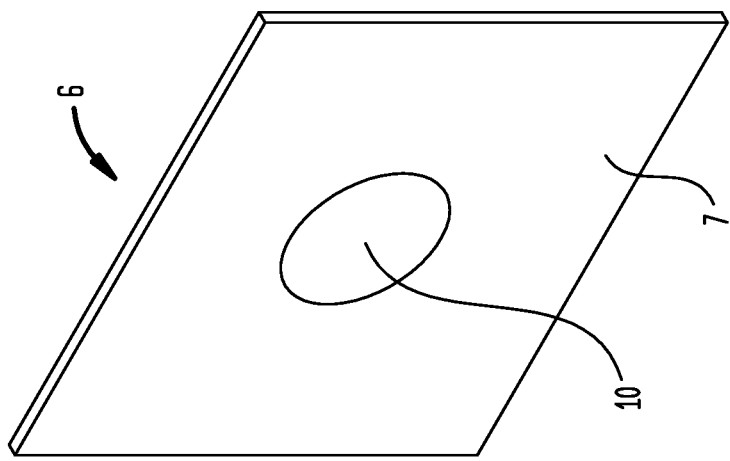
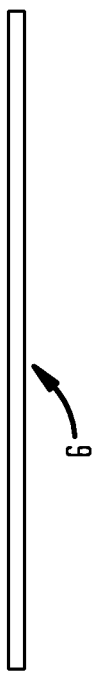

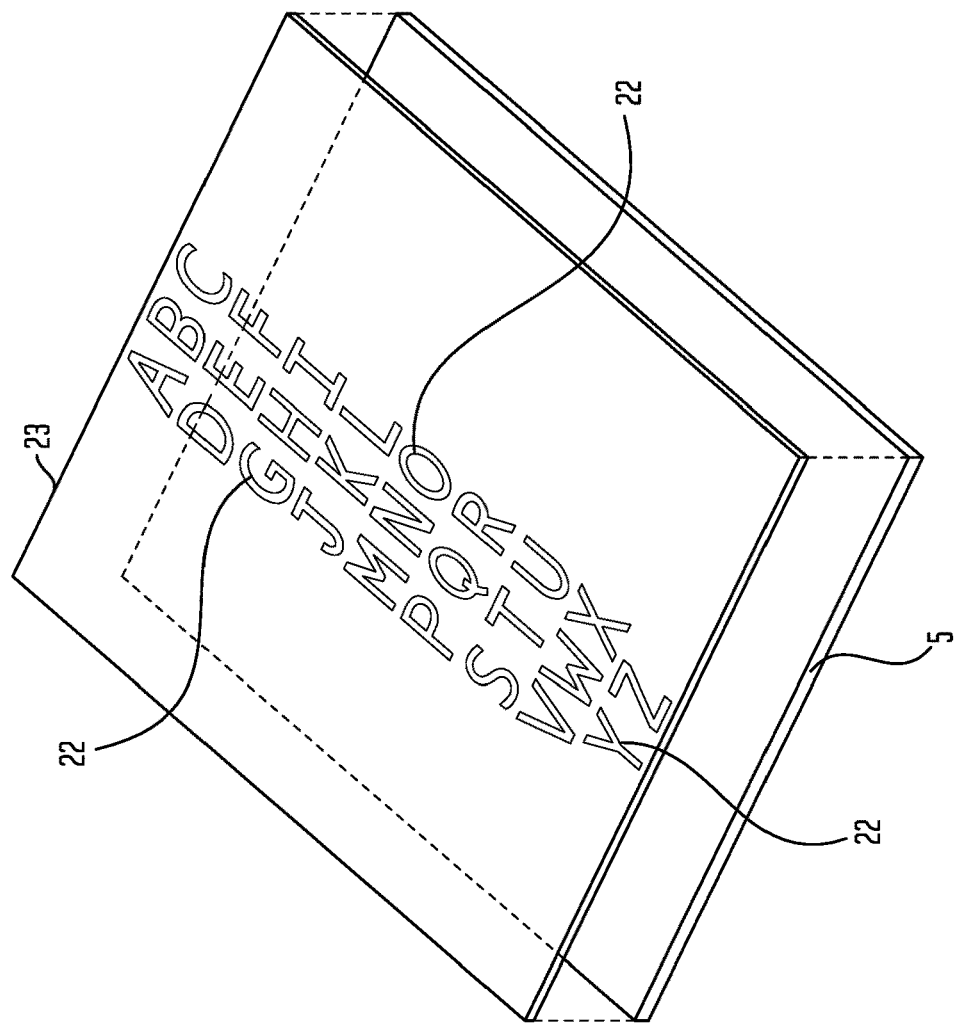
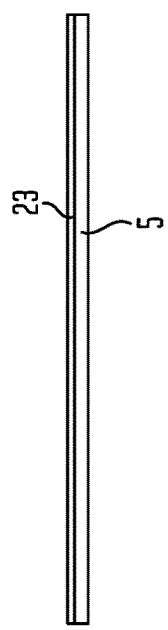
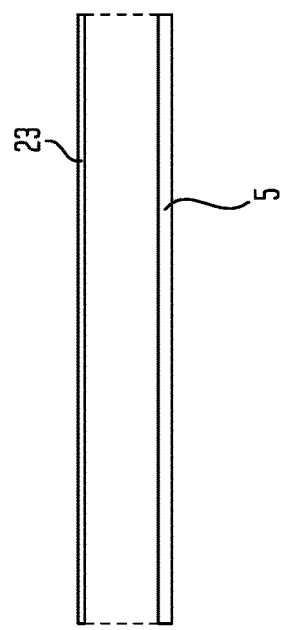

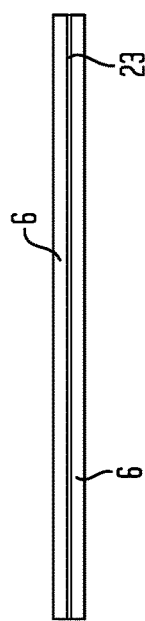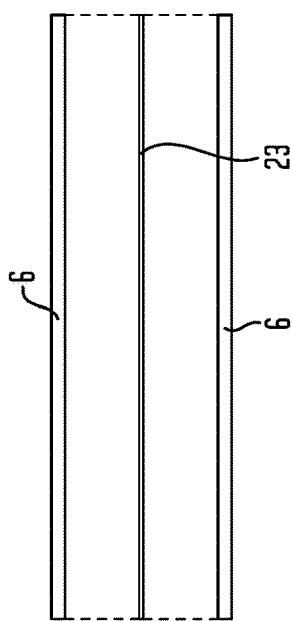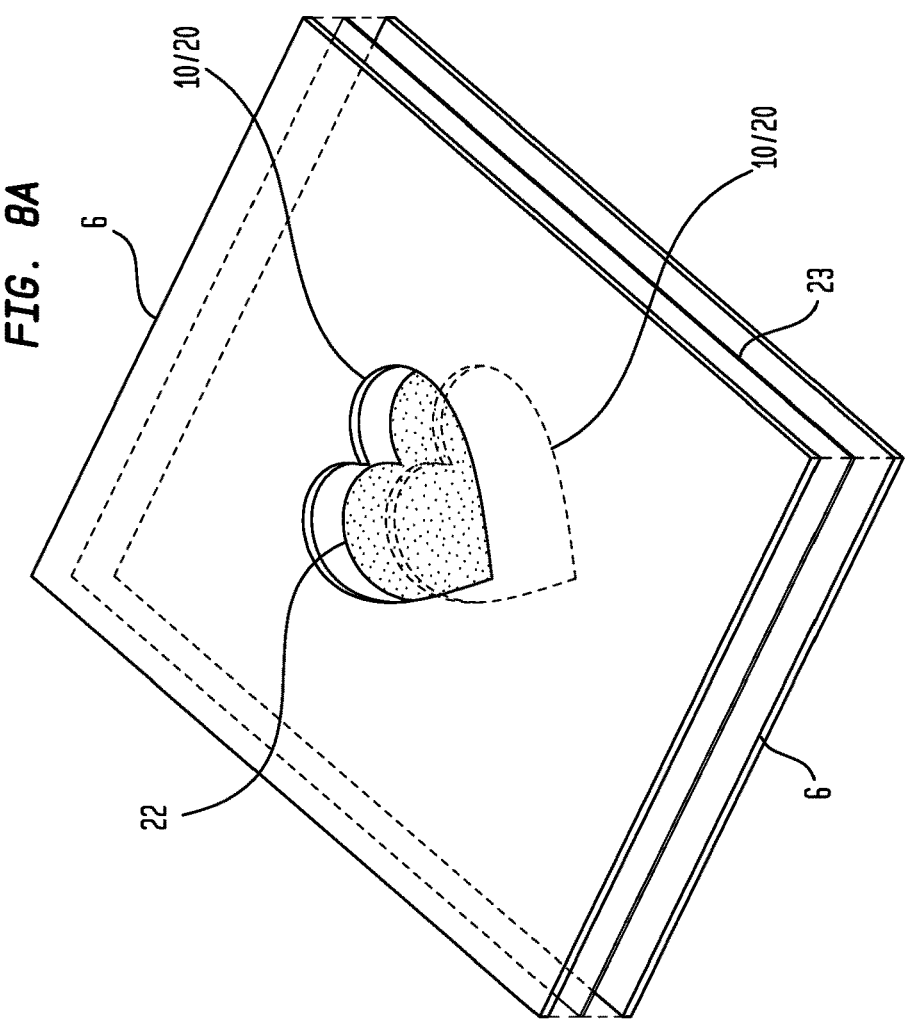

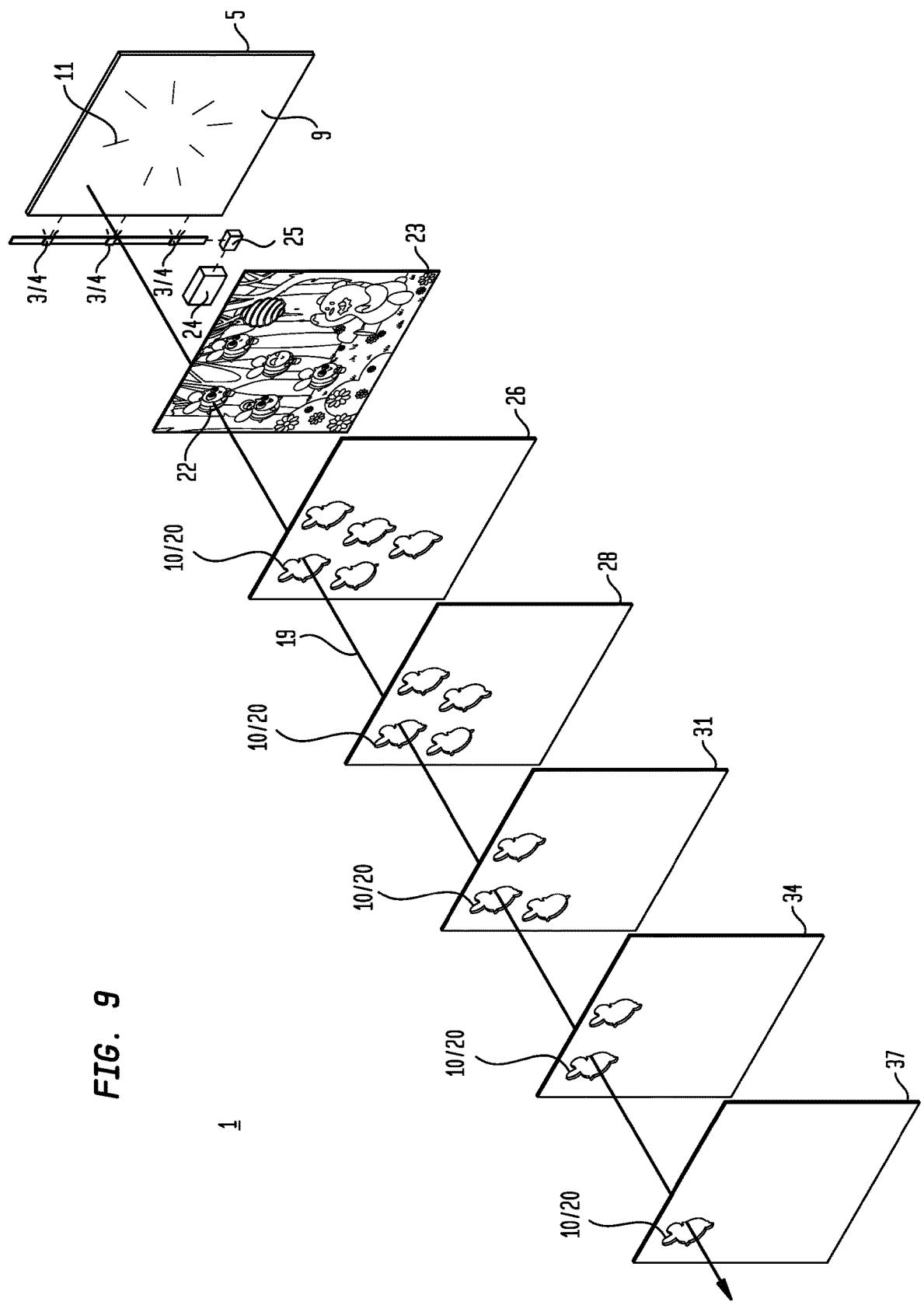

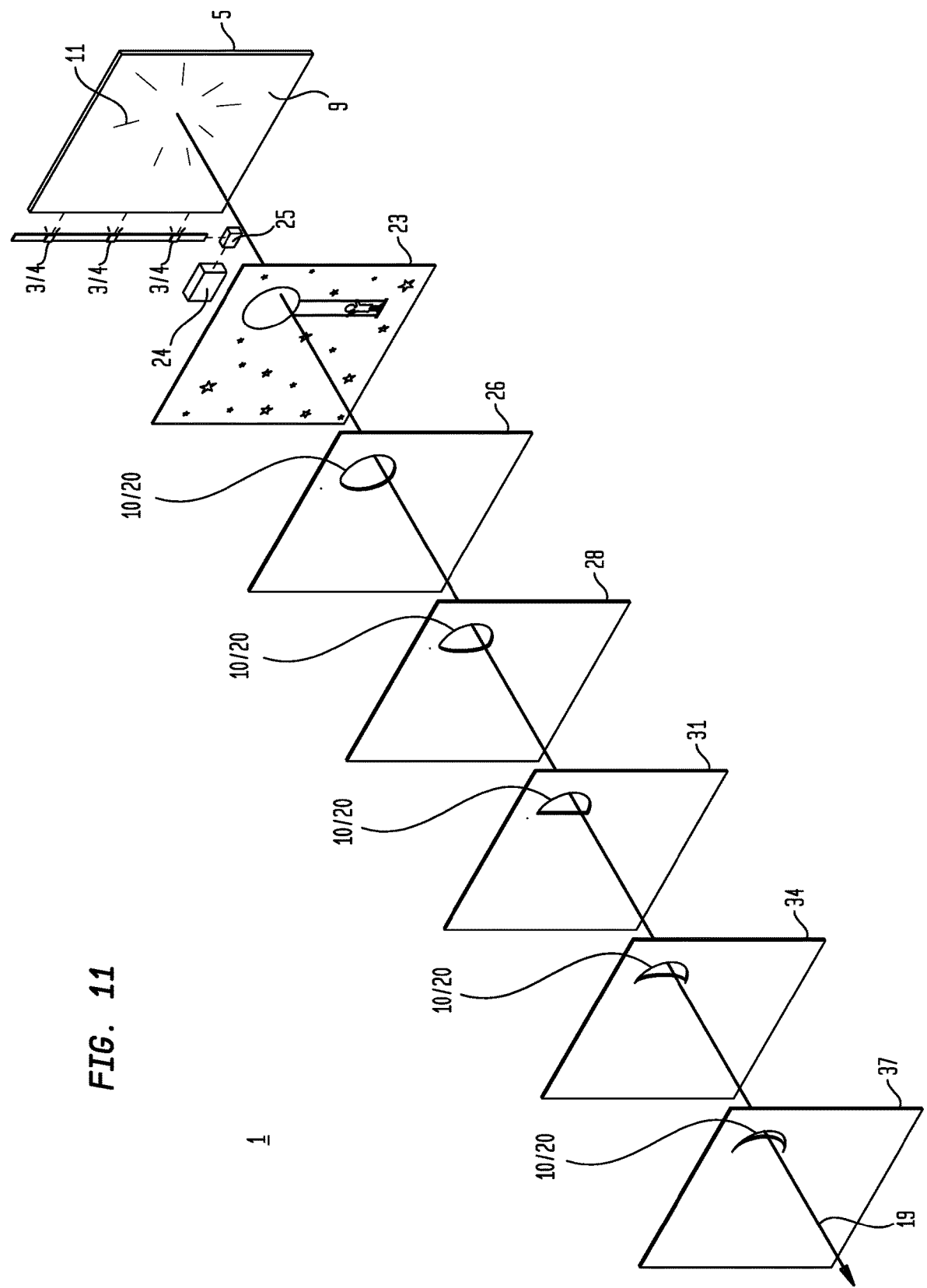

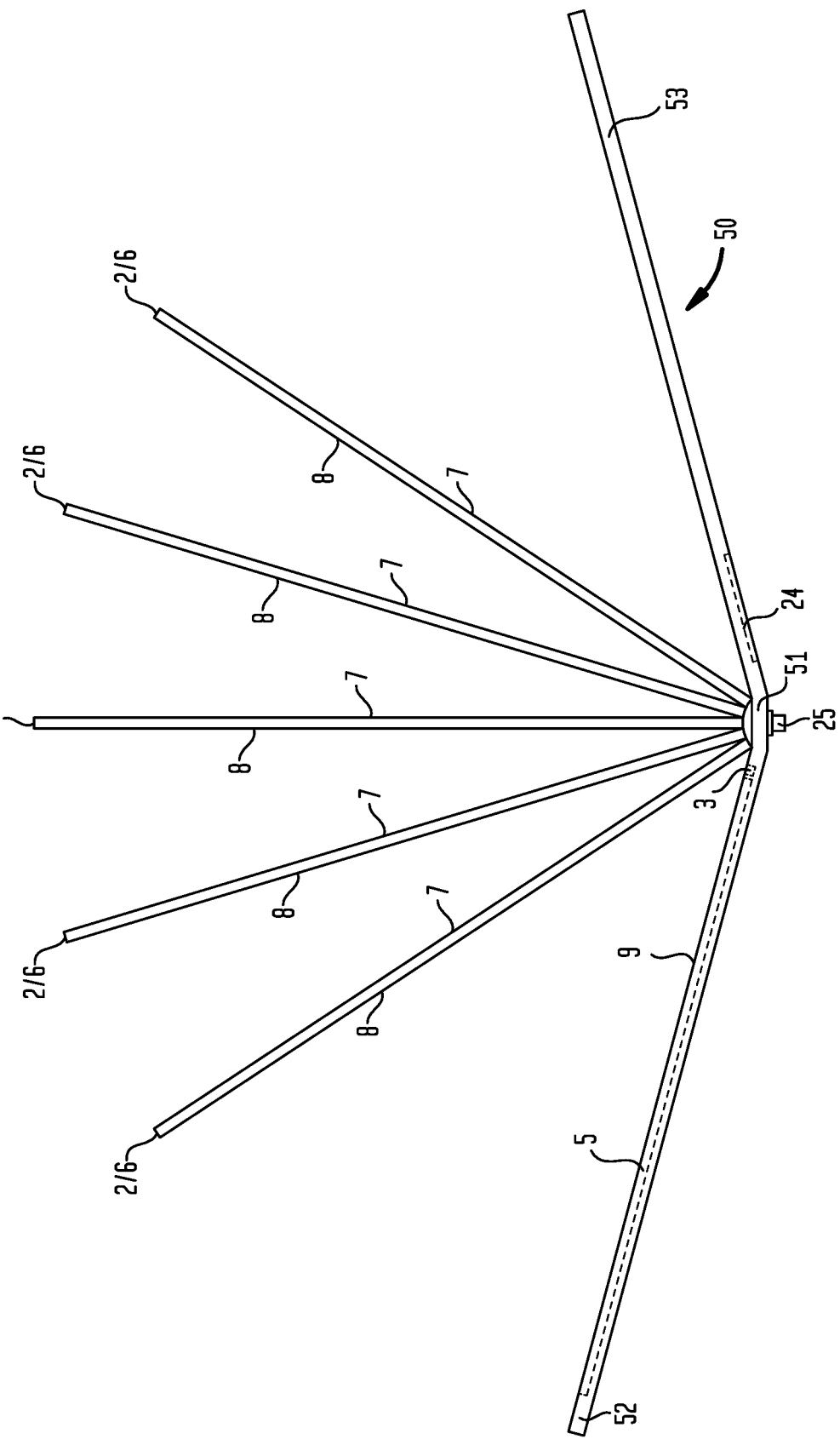

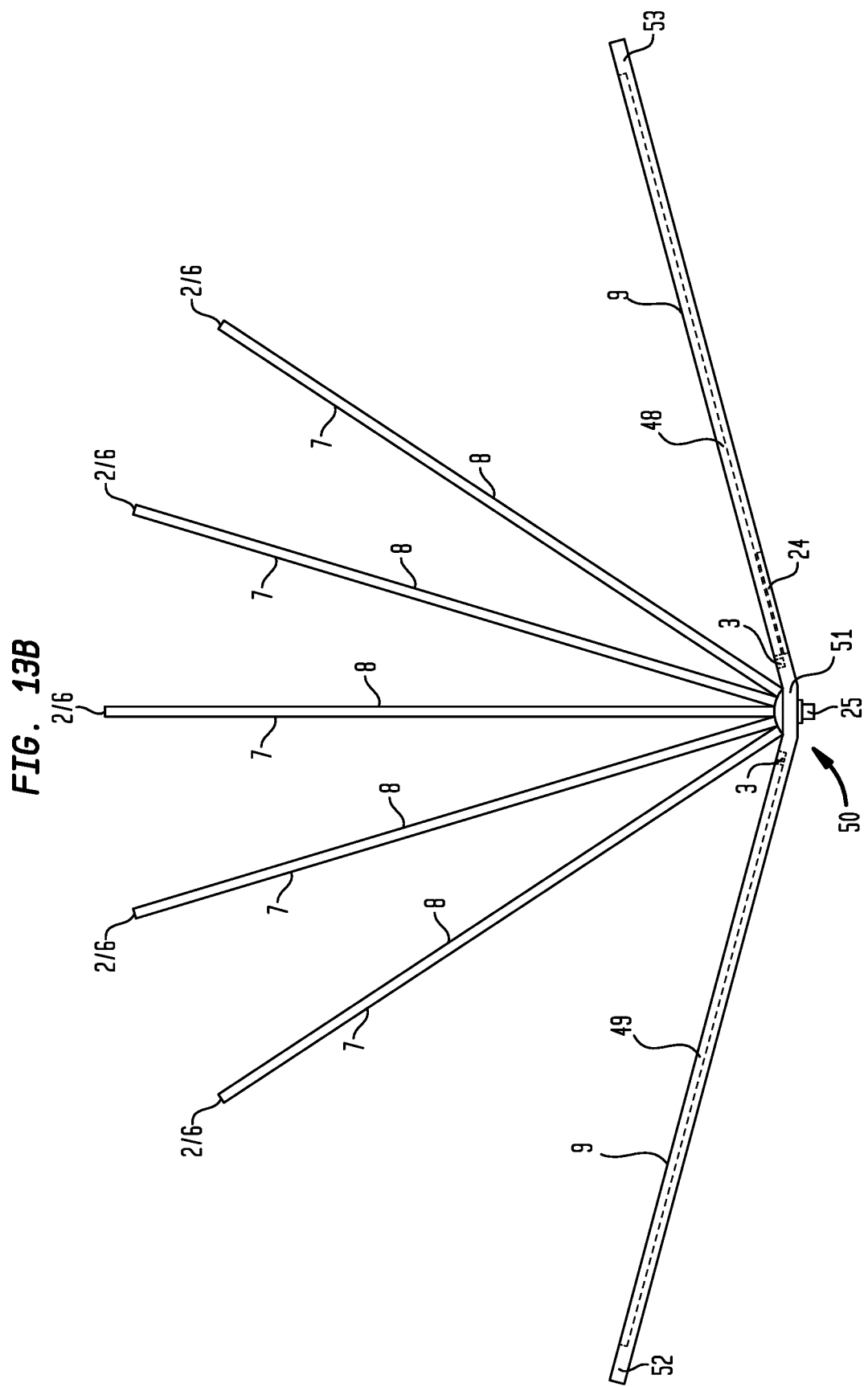

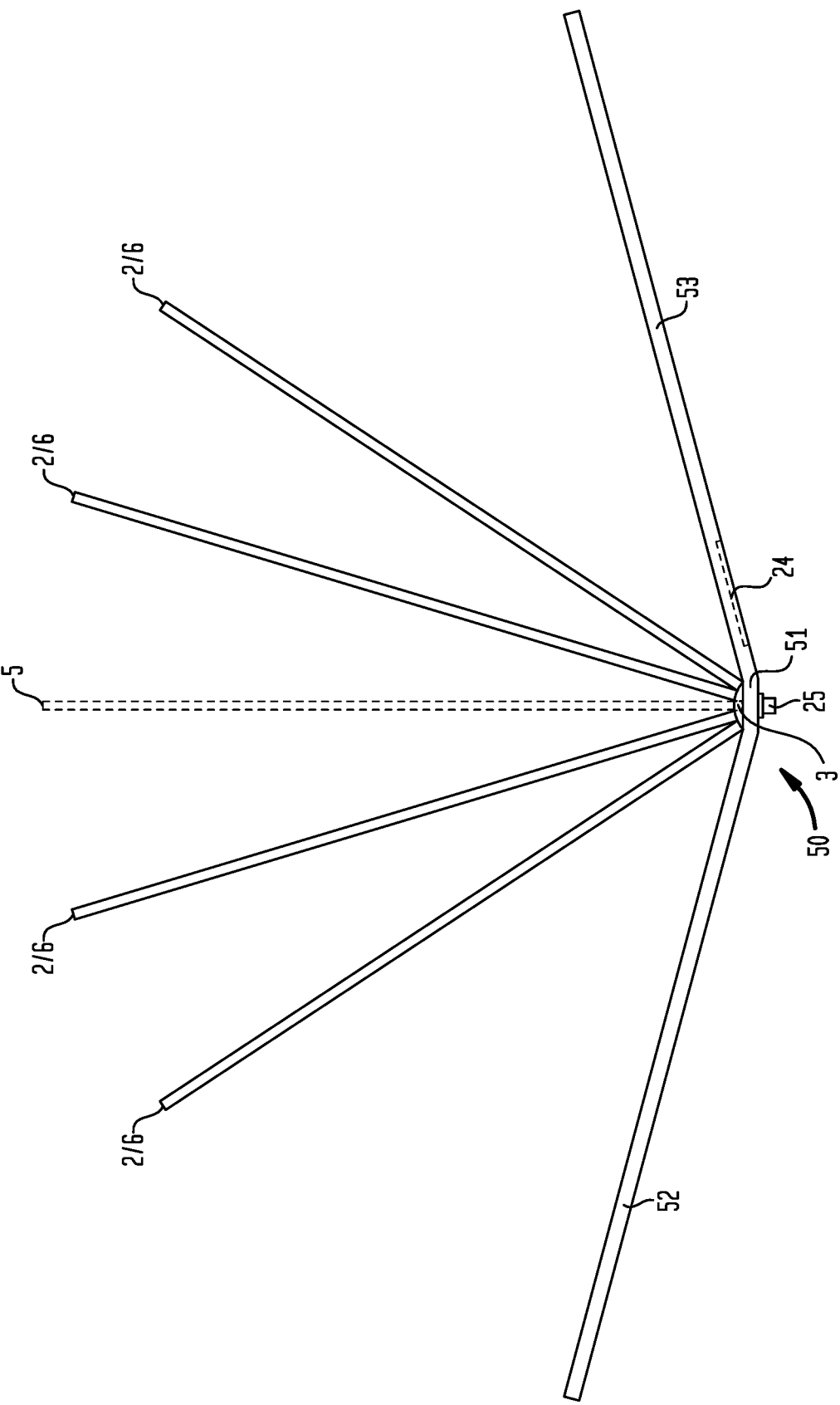

ILLUMINATED ASSEMBLY

I. BRIEF SUMMARY OF THE INVENTION

A broad object of a particular embodiment of the invention can be to provide an illuminated assembly, and methods of making and using such an illuminated assembly, whereby the illuminated assembly includes a panel and at least one sheet coupled to the panel, the sheet capable of overlaying engagement with the panel. The sheet can include a sheet front surface opposite a sheet back surface, and at least one light transmission portion disposed therein, whereby the light transmission portion can communicate between the sheet front and back surfaces. Further, the illuminated assembly can include a light source operatively coupled to the panel, whereby in an activated condition, the light source can provide light to the panel. Following, the light can be transmitted from the panel through the light transmission portion of the sheet such that the light can be viewable by a viewer of the sheet front surface.

Naturally, further objects of the invention are disclosed throughout other areas of the specification, drawings, and claims.

II. BRIEF DESCRIPTION OF THE DRAWINGS

FIG. 1 is an illustration of a method of using a particular embodiment of the illuminated assembly.

FIG. 2 is a bottom view of a particular embodiment of the illuminated assembly, whereby a panel, a light source, and a power source can be disposed within a rear cover element of the illuminated assembly.

FIG. 3D is a top view of the particular embodiment of the illuminated assembly shown in FIG. 3A.

FIG. 3E is a bottom view of the particular embodiment of the illuminated assembly shown in FIG. 3A.

FIG. 3F is a first side view of the particular embodiment of the illuminated assembly shown in FIG. 3A.

FIG. 3G is a second side view of the particular embodiment of the illuminated assembly shown in FIG. 3A.

Figure 4B:
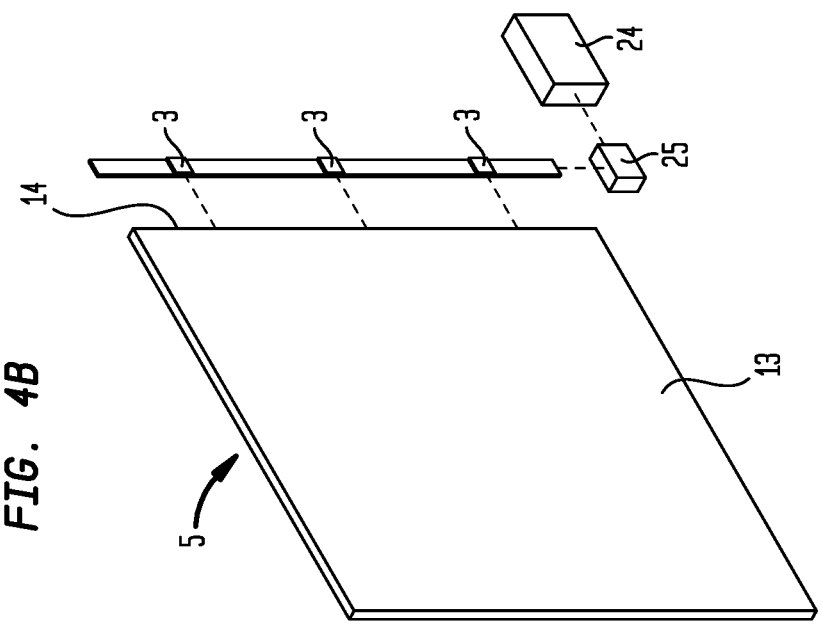
FIG. 4B is a rear perspective view of the particular embodiment of the panel shown in FIG. 4A, whereby a light source, an actuator, and a power source are shown exploded from a panel edge of the panel.
Figure 4C:
FIG. 4A is a front perspective view of a particular embodiment of a panel of the illuminated assembly, whereby a light source, an actuator, and a power source are shown exploded from a panel edge of the panel.
Figure 4A:
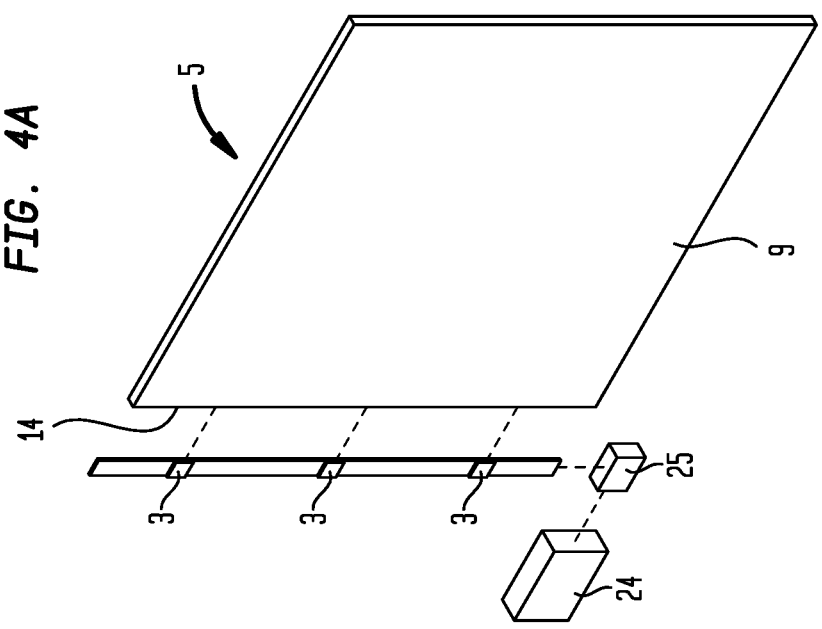

FIG. 4C can be a top, bottom, first side, or second side view of the particular embodiment of the panel shown in FIG. 4A.

FIG. 5A is a front perspective view of a particular embodiment of a sheet of the illuminated assembly.

FIG. 5B is a rear perspective view of the particular embodiment of the sheet shown in FIG. 5A.

FIG. 5C can be a top, bottom, first side, or second side view of the particular embodiment of the sheet shown in FIG. 5A.

Figure 6A:
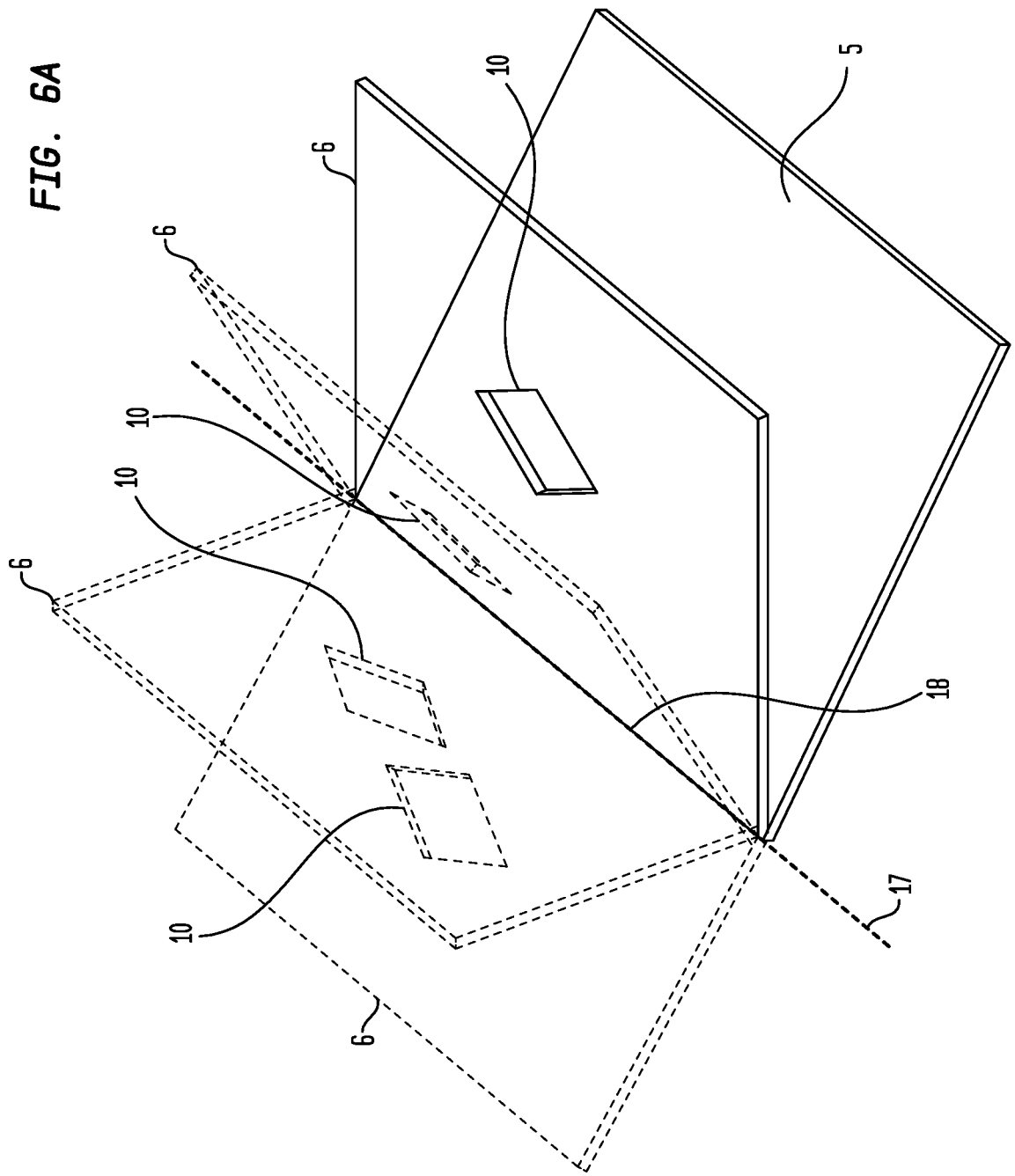

FIG. 6A is a perspective view of a particular embodiment of the illuminated assembly, whereby a sheet can be pivotally coupled or rotatably coupled to a panel.

Figure 6B:
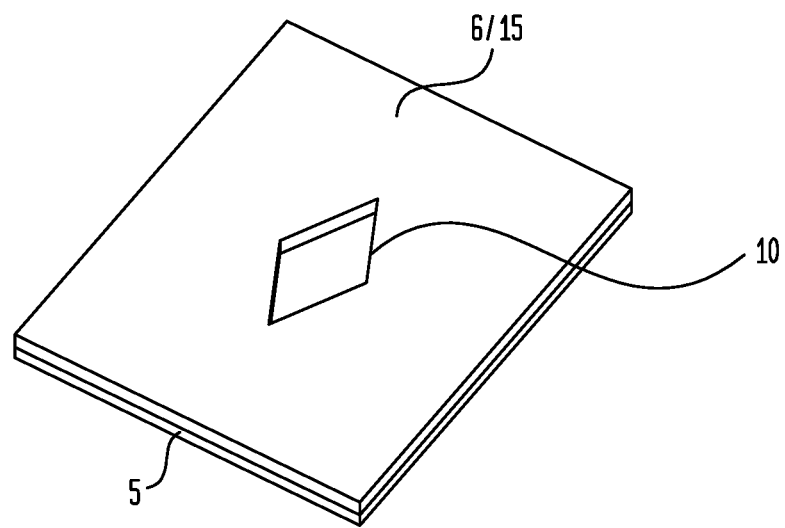

FIG. 6B is a perspective view of the particular embodiment of the illuminated assembly shown in FIG. 6A, whereby the sheet disposes in a first position and/or overlayingly engages the panel.

Figure 6C:
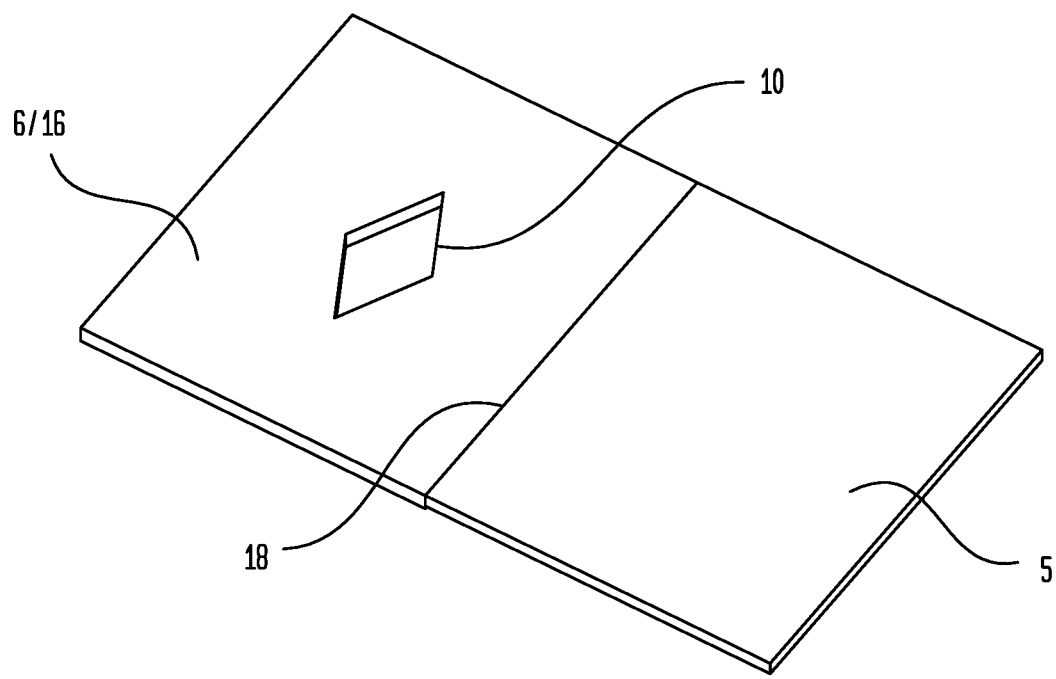

FIG. 6C is a perspective view of the particular embodiment of the illuminated assembly shown in FIG. 6A, whereby the sheet disposes in a second position and/or disposes away from the panel.

FIG. 7A is a perspective view of a particular embodiment of a panel and a layer of the illuminated assembly, whereby the layer is shown exploded from the panel.

FIG. 7B can be a top, bottom, first side, or second side view of a particular embodiment of a panel and a layer of the illuminated assembly.

FIG. 7C can be a top, bottom, first side, or second side view of a particular embodiment of a panel and a layer of the illuminated assembly, whereby the layer is shown exploded from the panel.

FIG. 8A is a perspective view of a particular embodiment of a sheet and a layer of the illuminated assembly, whereby the layer is shown exploded from the sheet.

FIG. 8B can be a top, bottom, first side, or second side view of a particular embodiment of a sheet and a layer of the illuminated assembly.

FIG. 8C can be a top, bottom, first side, or second side view of a particular embodiment of a sheet and a layer of the illuminated assembly, whereby the layer is shown exploded from the sheet.

FIG. 9 is a perspective view of a particular embodiment of the illuminated assembly.

Figure 10A:
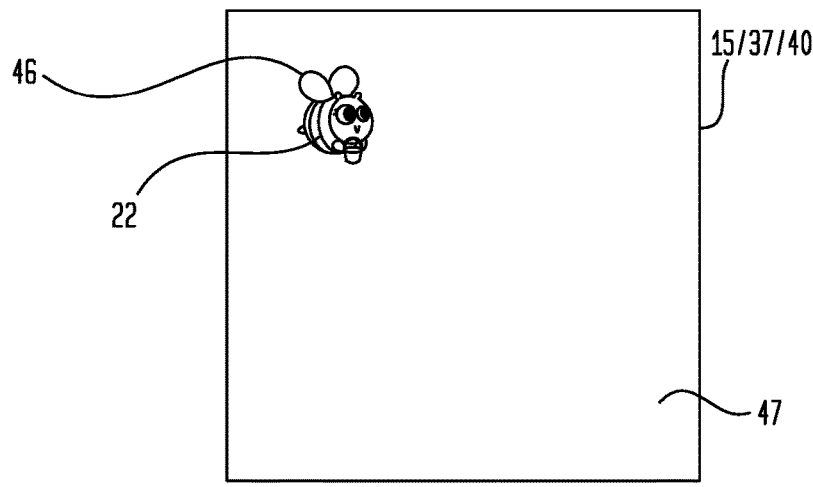

FIG. 10A is a perspective view of a particular embodiment of the illuminated assembly having five sheets movably coupled to a panel, whereby the first, second, third, fourth, and fifth sheets dispose in a first position and/or overlayingly engage the panel.

Figure 10B:
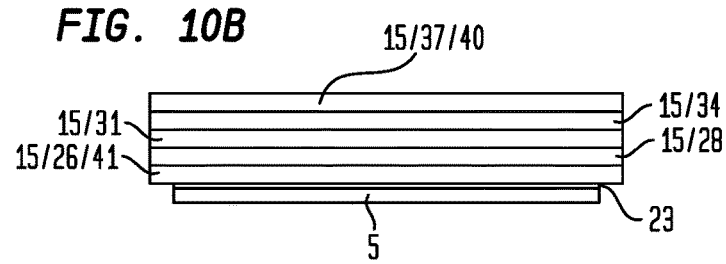

FIG. 10B is a bottom view of the particular embodiment of the illuminated assembly shown in FIG. 10A.

Figure 10C:
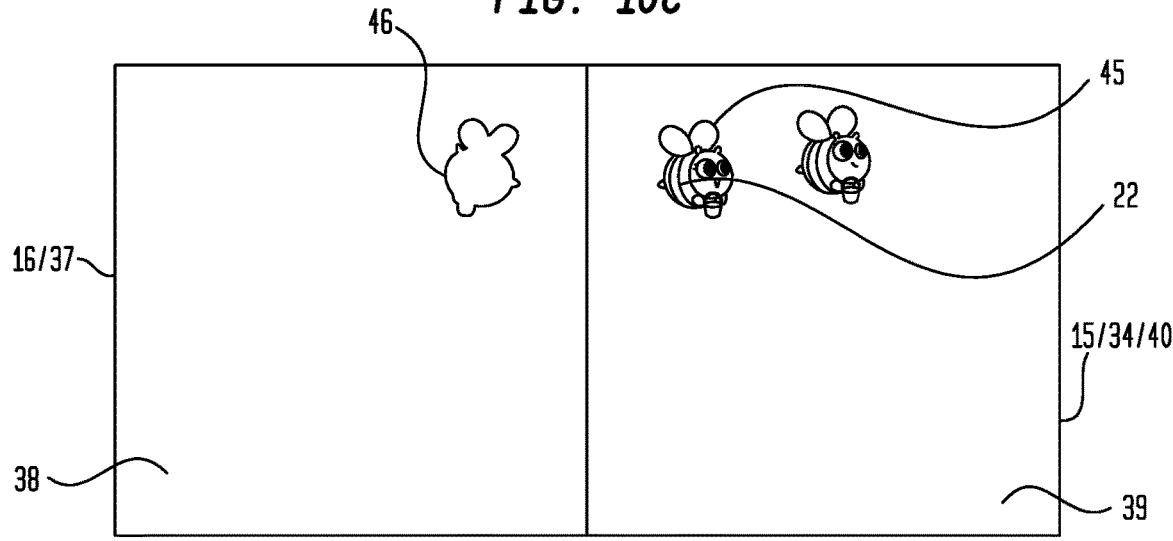

FIG. 10C is a perspective view of the particular embodiment of the illuminated assembly shown in FIG. 10A, whereby the first, second, third, and fourth sheets dispose in a first position and/or overlayingly engage the panel, and the fifth sheet disposes in a second position and/or disposes away from the panel.

Figure 10D:
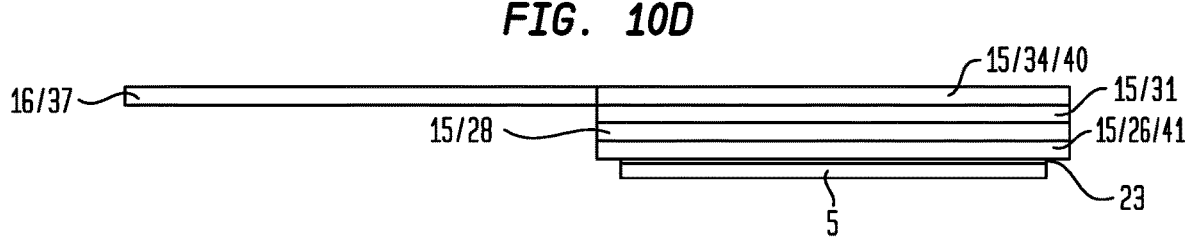

FIG. 10D is a bottom view of the particular embodiment of the illuminated assembly shown in FIG. 10C.

Figure 10E:
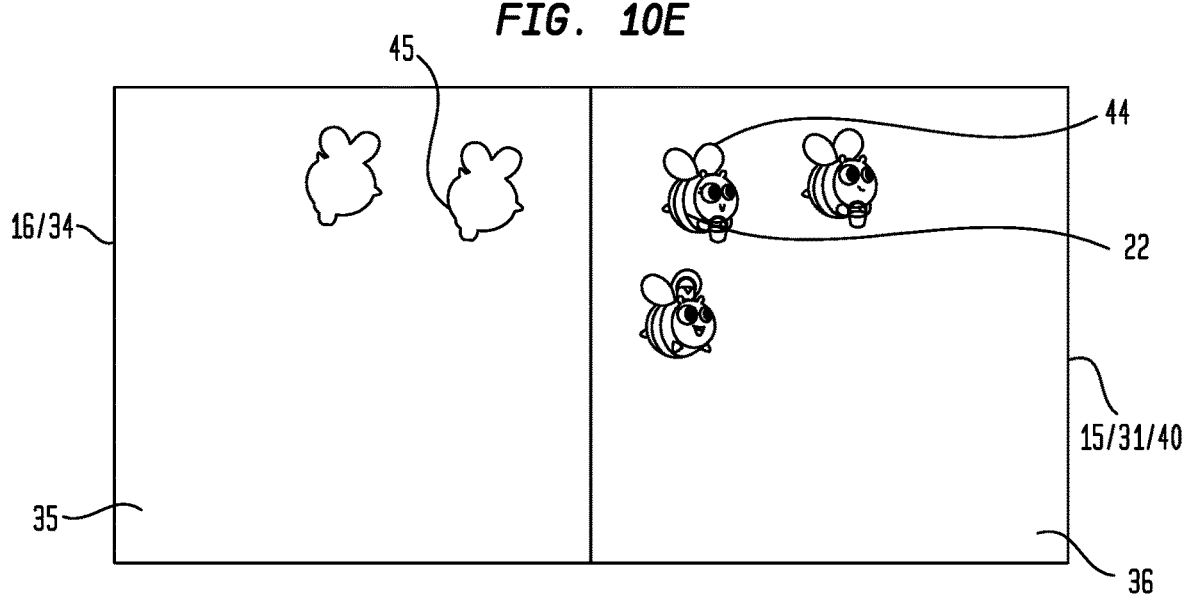

FIG. 10E is a perspective view of the particular embodiment of the illuminated assembly shown in FIG. 10A, whereby the first, second, and third sheets dispose in a first position and/or overlayingly engage the panel, and the fourth and fifth sheets dispose in a second position and/or dispose away from the panel.

Figure 10F:
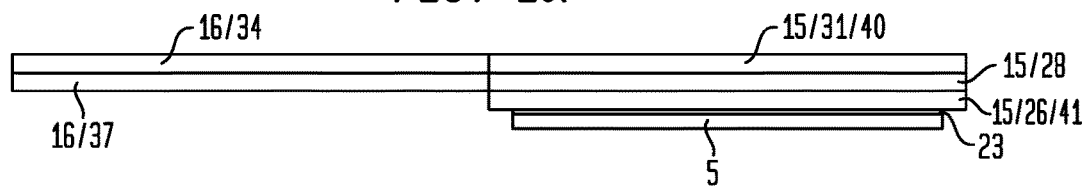

FIG. 10F is a bottom view of the particular embodiment of the illuminated assembly shown in FIG. 10E.

Figure 10G:
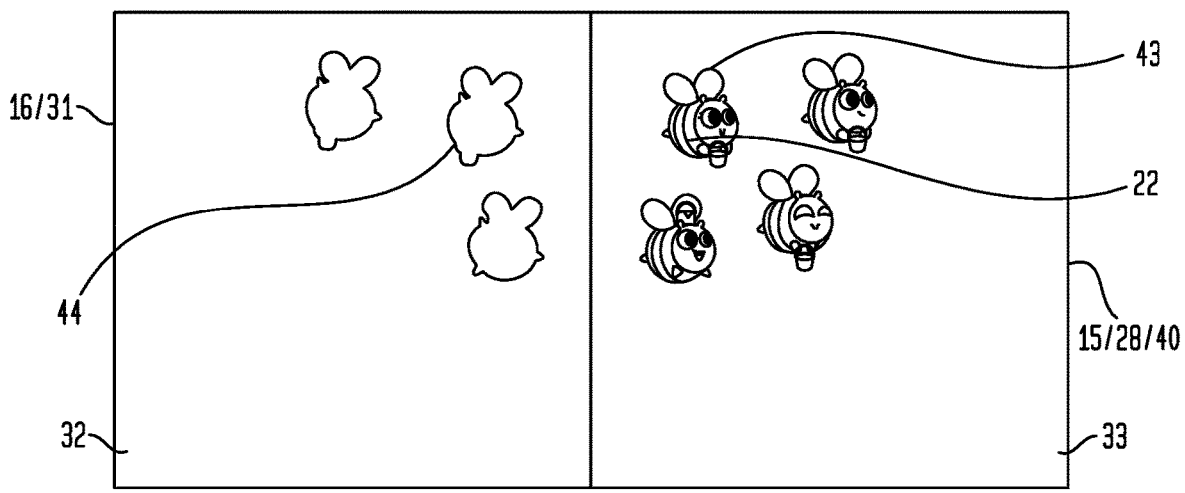

FIG. 10G is a perspective view of the particular embodiment of the illuminated assembly shown in FIG. 10A, whereby the first and second sheets dispose in a first position and/or overlayingly engage the panel, and the third, fourth, and fifth sheets dispose in a second position and/or dispose away from the panel.

Figure 10H:
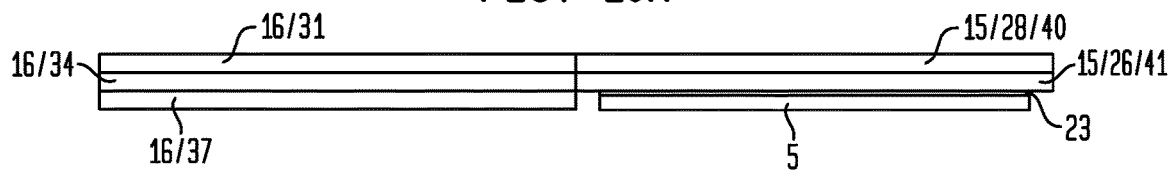

FIG. 10H is a bottom view of the particular embodiment of the illuminated assembly shown in FIG. 10G.

Figure 10I:
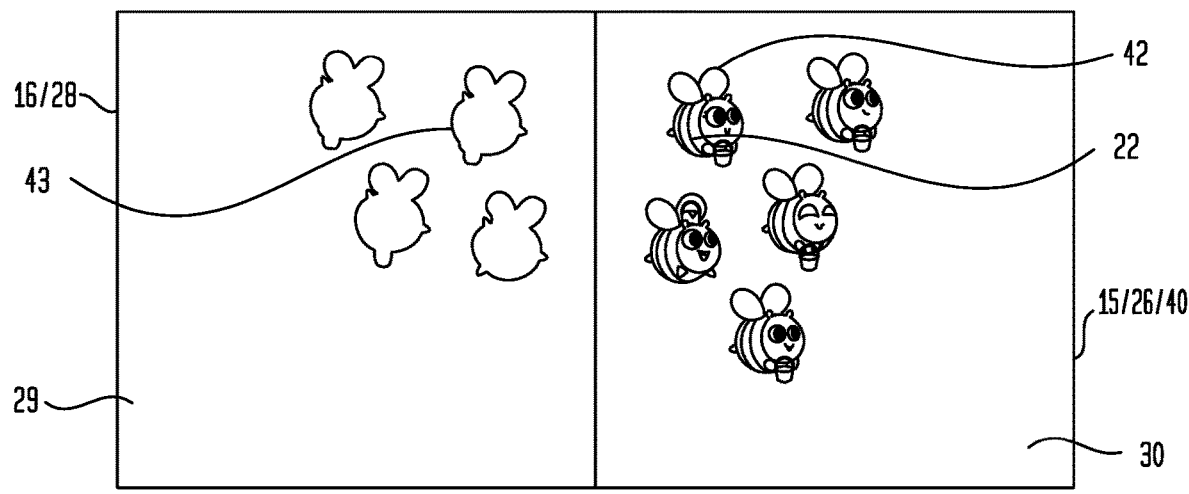

FIG. 10I is a perspective view of the particular embodiment of the illuminated assembly shown in FIG. 10A, whereby the first sheet disposes in a first position and/or overlayingly engages the panel, and the second, third, fourth, and fifth sheets dispose in a second position and/or dispose away from the panel.

Figure 10J:
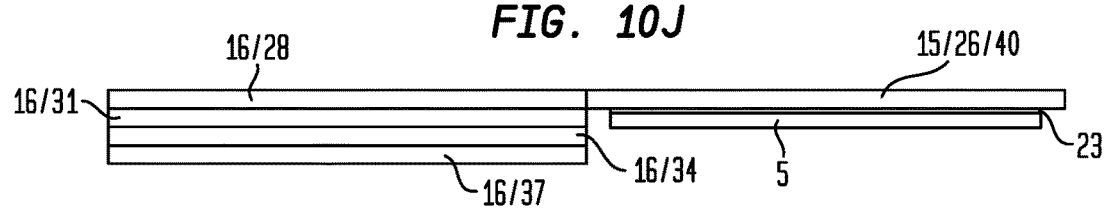

FIG. 10J is a bottom view of the particular embodiment of the illuminated assembly shown in FIG. 10I.

Figure 10K:
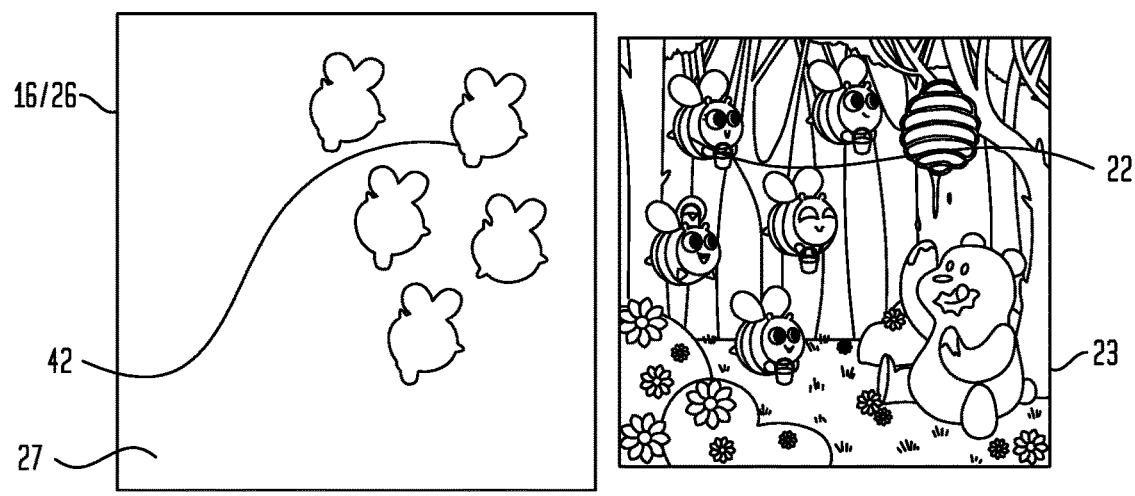

FIG. 10K is a perspective view of the particular embodiment of the illuminated assembly shown in FIG. 10A, whereby the first, second, third, fourth, and fifth sheets dispose in a second position and/or dispose away from the panel.

Figure 10L:
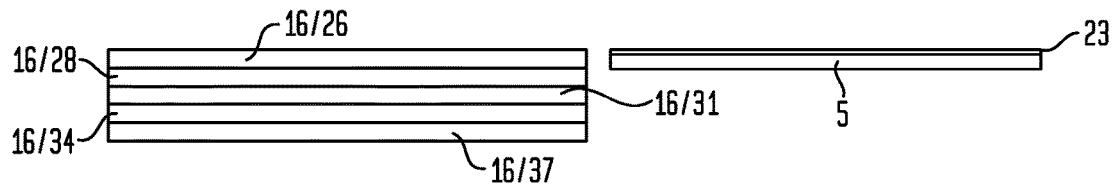

FIG. 10L is a bottom view of the particular embodiment of the illuminated assembly shown in FIG. 10K.

FIG. 11 is a perspective view of a particular embodiment of the illuminated assembly.

Figure 12A:
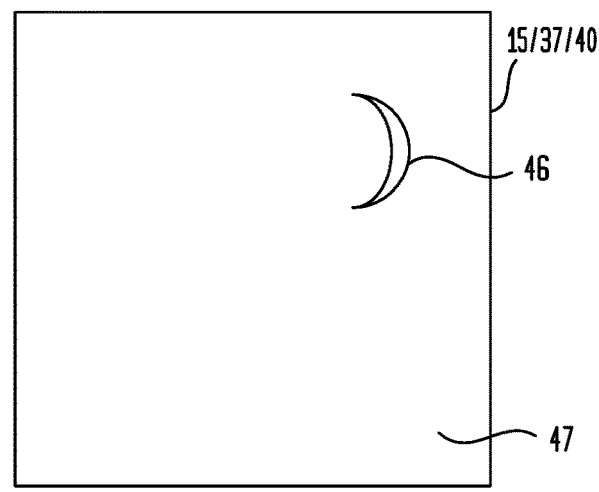

FIG. 12A is a perspective view of a particular embodiment of the illuminated assembly having five sheets movably coupled to a panel, whereby the first, second, third, fourth, and fifth sheets dispose in a first position and/or overlayingly engage the panel.

Figure 12B:
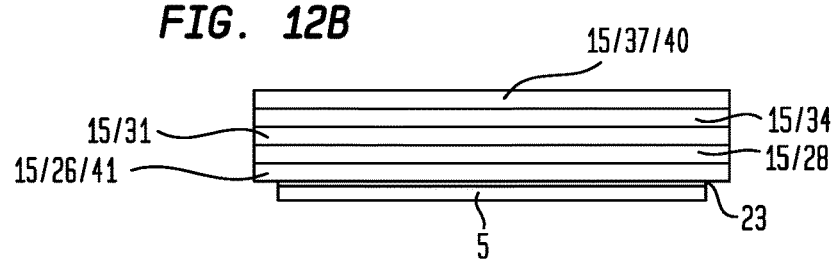

FIG. 12B is a bottom view of the particular embodiment of the illuminated assembly shown in FIG. 12A.

Figure 12C:
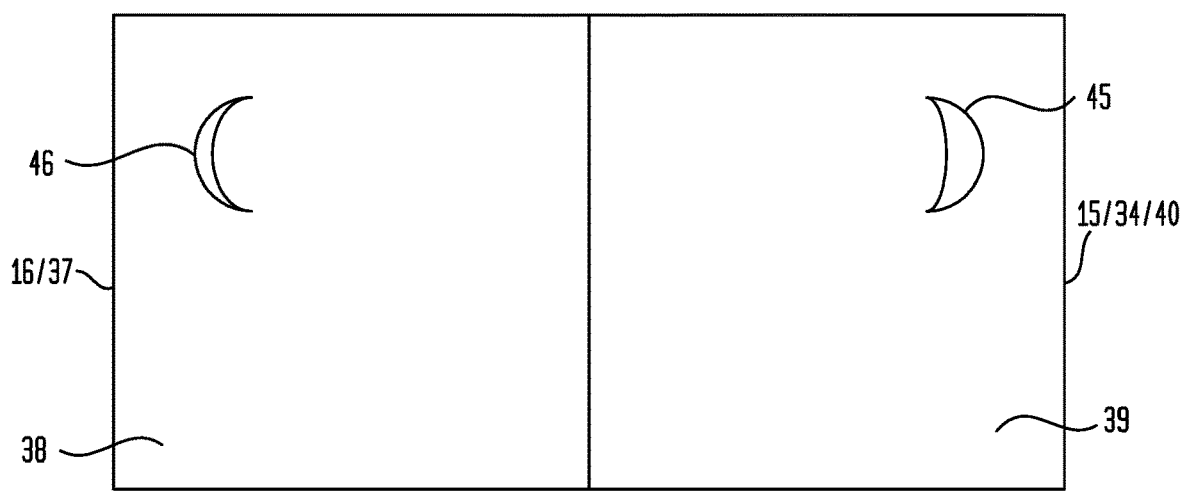

FIG. 12C is a perspective view of the particular embodiment of the illuminated assembly shown in FIG. 12A, whereby the first, second, third, and fourth sheets dispose in a first position and/or overlayingly engage the panel, and the fifth sheet disposes in a second position and/or disposes away from the panel.

Figure 12D:
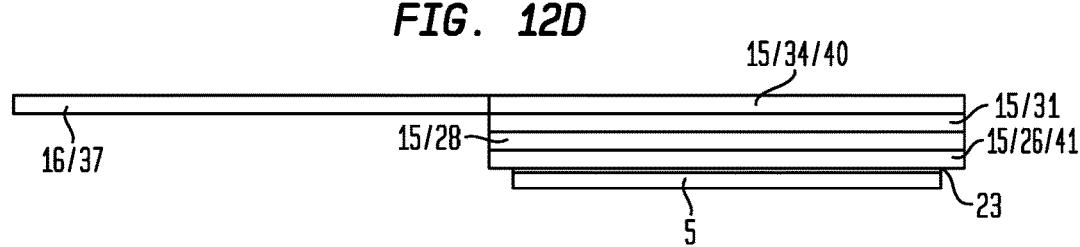

FIG. 12D is a bottom view of the particular embodiment of the illuminated assembly shown in FIG. 12C.

Figure 12E:
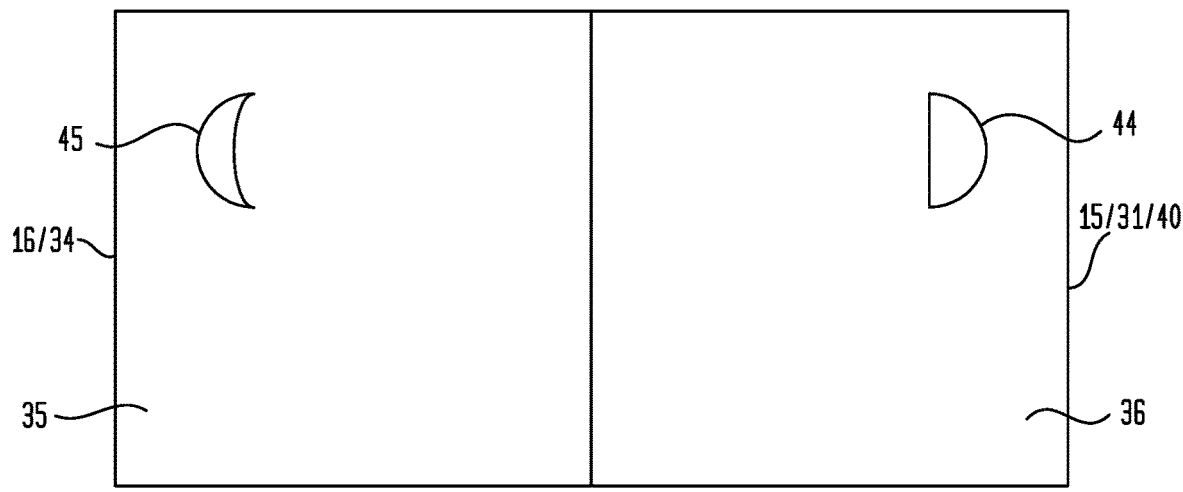

FIG. 12E is a perspective view of the particular embodiment of the illuminated assembly shown in FIG. 12A, whereby the first, second, and third sheets dispose in a first position and/or overlayingly engage the panel, and the fourth and fifth sheets dispose in a second position and/or dispose away from the panel.

Figure 12F:
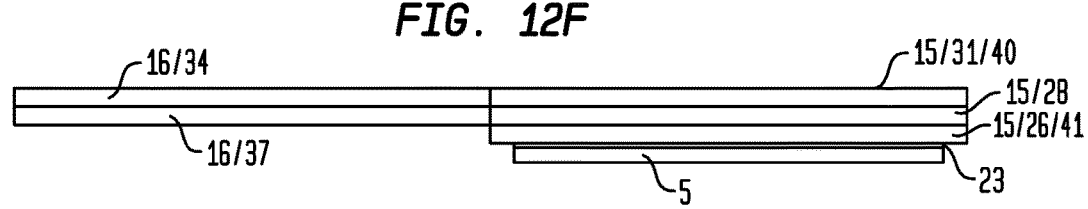

FIG. 12F is a bottom view of the particular embodiment of the illuminated assembly shown in FIG. 12E.

Figure 12G:
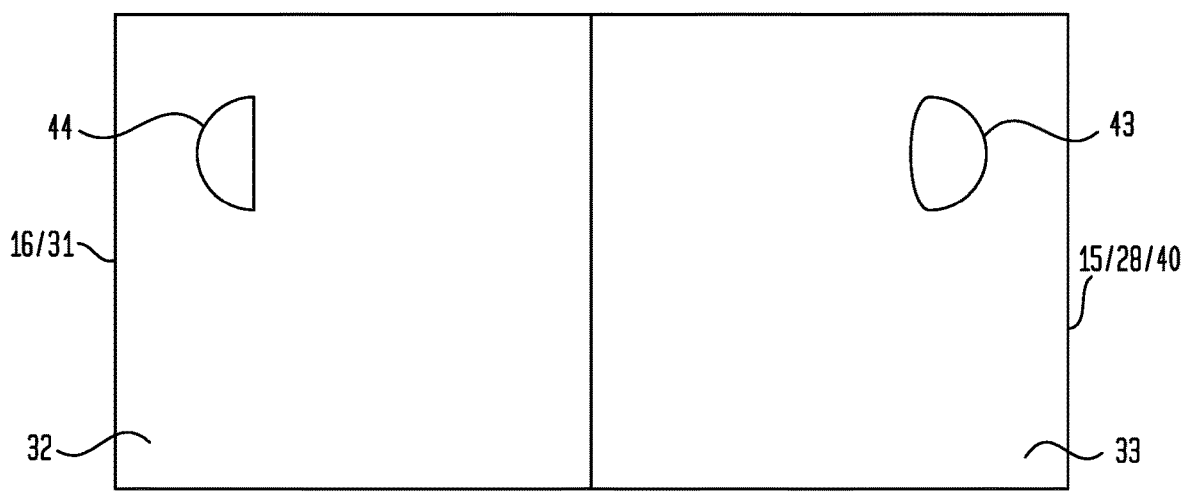

FIG. 12G is a perspective view of the particular embodiment of the illuminated assembly shown in FIG. 12A, whereby the first and second sheets dispose in a first position and/or overlayingly engage the panel, and the third, fourth, and fifth sheets dispose in a second position and/or dispose away from the panel.

Figure 12H:
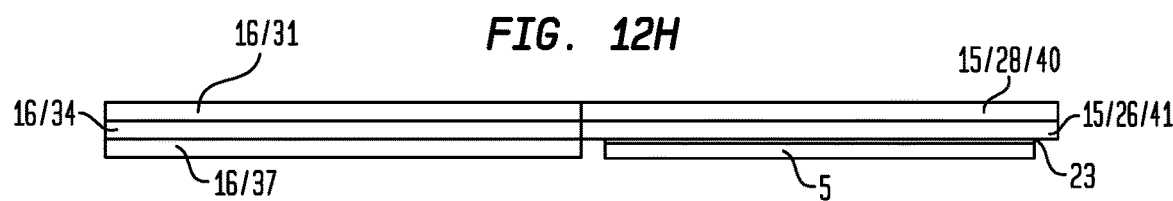

FIG. 12H is a bottom view of the particular embodiment of the illuminated assembly shown in FIG. 12G.

Figure 12I:
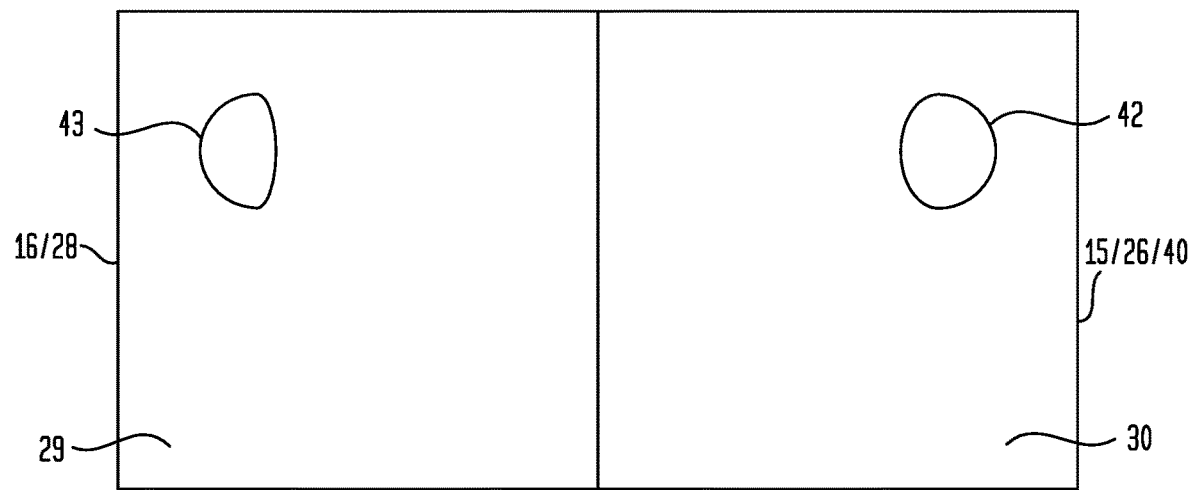

FIG. 12I is a perspective view of the particular embodiment of the illuminated assembly shown in FIG. 12A, whereby the first sheet disposes in a first position and/or overlayingly engages the panel, and the second, third, fourth, and fifth sheets dispose in a second position and/or dispose away from the panel.

Figure 12J:
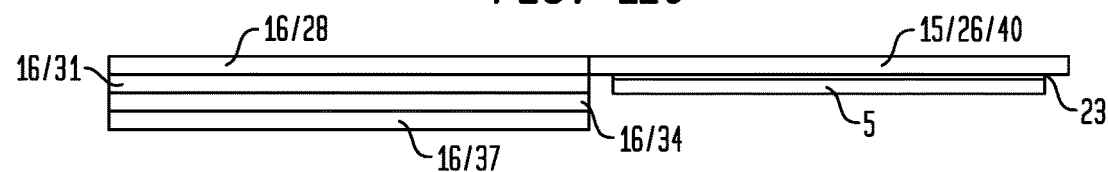

FIG. 12J is a bottom view of the particular embodiment of the illuminated assembly shown in FIG. 12I.

Figure 12K:
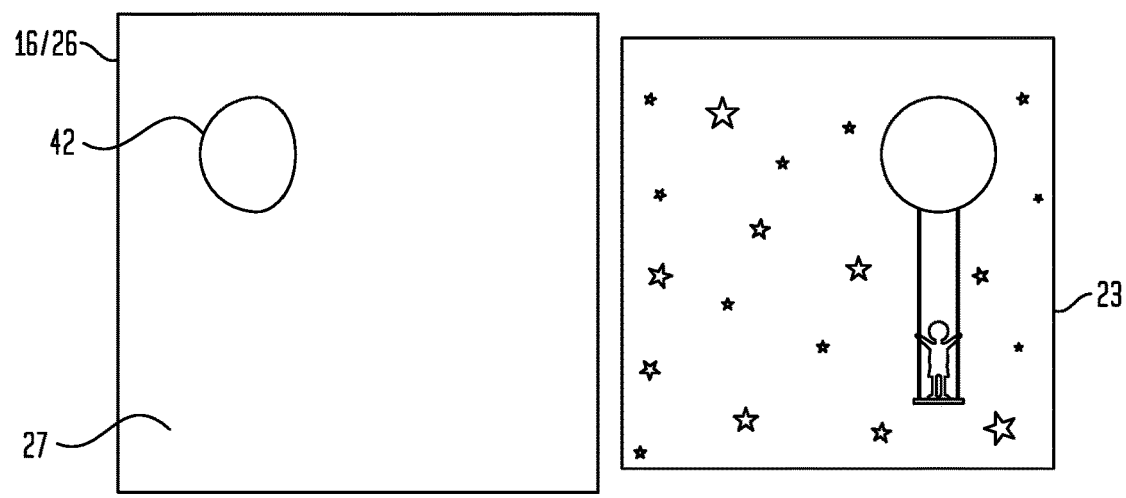

FIG. 12K is a perspective view of the particular embodiment of the illuminated assembly shown in FIG. 12A, whereby the first, second, third, fourth, and fifth sheets dispose in a second position and/or dispose away from the panel.

Figure 12L:
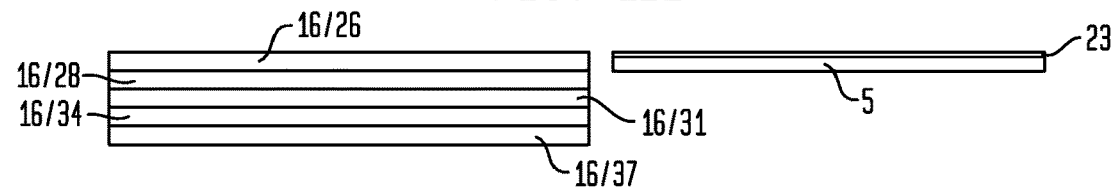

FIG. 12L is a bottom view of the particular embodiment of the illuminated assembly shown in FIG. 12K.

FIG. 13A is a bottom view of a particular embodiment of the illuminated assembly, whereby a panel and a light source can be disposed within a front cover element of the illuminated assembly.

FIG. 13B is a bottom view of a particular embodiment of the illuminated assembly, whereby a panel and a light source can be disposed within a front cover element of the illuminated assembly, and a panel, a light source, and a power source can be disposed within a rear cover element of the illuminated assembly.

FIG. 13C is a bottom view of a particular embodiment of the illuminated assembly, whereby a panel and a light source can be disposed between a plurality of sheets of the illuminated assembly.

III. DETAILED DESCRIPTION OF THE INVENTION

Now referring primarily to FIG. 1, which illustrates a method of using a particular embodiment of the inventive illuminated assembly (1) including at least one page (2) and a light source (3) operatively coupled to the page (2), whereby the light source (3) in an activated condition (4) can illuminate at least a portion of the page (2). The method of use can include activating the light source (3) to the activated condition (4) and viewing the page (2) having at least a portion of the page (2) illuminated by the light source (3).

The illuminated assembly (1) includes a panel (5) which can operatively couple the light source (3) to the page (2). Additionally, the illuminated assembly (1) includes at least one sheet (6) coupled to the panel (5), whereby the sheet (6) can provide the page (2).

The term "sheet" as used herein can mean something that may be relatively thin in comparison to its length and width. As to particular embodiments, a sheet (6) may be a square or rectangular piece of paper or paper product, especially one which may be written or printed upon; however, a sheet (6) as used herein is not limited to a square or rectangular perimeter, nor is a sheet (6) as used herein limited to being made from paper or a paper product.

The sheet (6) can include a sheet front surface (7) opposite a sheet back surface (8), whereby the sheet (6) can be capable of overlaying engagement with the panel (5). As to particular embodiments, the sheet back surface (8) can be capable of overlaying engagement with a panel first surface (9) of the panel (5).

The term "overlay" as used herein can mean to extend over so as to cover at least partially, to place or be placed so that at least a part of one covers at least a part of another, to lie over, or to overlap.

The term "overlaying engagement" as used herein can refer to partial overlaying engagement, being partially overlayingly engaged, entire overlaying engagement, or being entirely overlayingly engaged, depending upon the embodiment.

The term "overlaying engagement" as used herein should be broadly construed as meaning that there may or may not be something disposed between the elements which are overlayingly engaged, depending upon the embodiment. For example, when the sheet (6) disposes in overlaying engagement with the panel (5), there may or may not be something disposed between the sheet (6) and the panel (5) or between the sheet back surface (8) and the panel first surface (9), depending upon the embodiment.

The sheet (6) can include at least one light transmission portion (10) disposed therein, whereby the light transmission portion (10) can communicate between the sheet front and back surfaces (7)(8).

Correspondingly, the light source (3) in an activated condition (4) can provide light (11) to the panel (5). Following, the light (11) can be transmitted from the panel (5) through the light transmission portion (10) of the sheet (6) such that the light (11) can be viewable by a viewer (12) of the sheet front surface (7).

Panel

Now referring primarily to FIG. 2, FIGS. 4A-4C, FIGS. 6A-6C, and FIGS. 9-13C, the illuminated assembly (1) can include a panel (5) having a panel first surface (9) opposite a panel second surface (13). A light source (3) can be operatively coupled to the panel (5), whereby the light source (3) in an activated condition (4) can provide light (11) to the panel (5).

As to particular embodiments, the light source (3) in an activated condition (4) can provide light (11) to the panel first surface (9), thereby illuminating the panel first surface (9).

As to particular embodiments, the light source (3) in an activated condition (4) can provide light (11) to the panel second surface (13), thereby illuminating the panel second surface (13).

As to particular embodiments, the light source (3) in an activated condition (4) can provide light (11) to both the panel first and second surfaces (9)(13), thereby illuminating both the panel first and second surfaces (9)(13).

Now referring primarily to FIG. 4A-4C, the panel first and second surfaces (9)(13) can be configured as generally planar or flat panel first and second surfaces (9)(13) disposed a panel thickness apart. As to particular embodiments, the panel thickness can be a generally uniform panel thickness typically in a range of between about 0.5 millimeters to about 10 millimeters. As to particular embodiments, the panel thickness can be selected from the group including or consisting of: between about 0.5 millimeters to about 1.5 millimeters, between about 1 millimeter to about 2 millimeters, between about 1.5 millimeters to about 2.5 millimeters, between about 2 millimeters to about 3 millimeters, between about 2.5 millimeters to about 3.5 millimeters, between about 3 millimeters to about 4 millimeters, between about 3.5 millimeters to about 4.5 millimeters, between about 4 millimeters to about 5 millimeters, between about 4.5 millimeters to about 5.5 millimeters, between about 5 millimeters to about 6 millimeters, between about 5.5 millimeters to about 6.5 millimeters, between about 6 millimeters to about 7 millimeters, between about 6.5 millimeters to about 7.5 millimeters, between about 7 millimeters to about 8 millimeters, between about 7.5 millimeters to about 8.5 millimeters, between about 8 millimeters to about 9 millimeters, between about 8.5 millimeters to about 9.5 millimeters, and between about 9 millimeters to about 10 millimeters.

As to particular embodiments, the panel (5) can be a light-diffusing panel (or a light guide panel or LGP) configured to diffuse the light (11) provided by the light source (3). As to particular embodiments, the panel (5) can be formed from one or more polymeric materials capable of diffusing light, including thermoplastic polymers capable of being extruded, thermoformed, molded, injection molded, or the like, such as polycarbonate, acrylic polymers, polystyrene, polyvinyl chloride, polyvinylidene fluoride, polyvinylidene fluoride-acrylic copolymers, imidized acrylic polymers, cyclic olefin copolymers, polyolefins, polyesters, styrene acrylonitrile, acrylonitrile-acrylate copolymers, acrylonitrile-methyl methacrylate copolymers, methyl methacrylate-styrene copolymers, other styrenic polymers or copolymers containing alpha-methyl styrene, polyethylene terephthalate glycol-modified, methacrylate-butadiene-styrene terpolymer, acrylonitrile-styrene-acrylate terpolymer, acrylonitrile butadiene styrene terpolymer, polycyclo-hexylethylene, or the like, or combinations thereof. As but one illustrative example, the thermoplastic polymer can include an acrylic polymer, such as poly(methylmethacrylate) (CAS number 9011-14-7). As to particular embodiments, the panel (5) formed from the thermoplastic polymer can be generally transparent, generally colorless, or combinations thereof.

As to particular embodiments, the panel (5) can diffuse the light (11) provided by the light source (3) such that the light (11) may generally uniformly illuminate the panel first surface (9) (and, as to particular embodiments, the panel second surface (13)).

As to particular embodiments, the panel (5) can diffuse the light (11) provided by the light source (3) when the light (11) is provided proximate, adjacent to, or to one or more panel edges, in which case the panel (5) may be referred to as an edge-lit panel or an edgelit panel.

Now referring primarily to FIG. 2, FIG. 4A, FIG. 4B, FIG. 9, FIG. 11, and FIG. 13A-13C, as to particular embodiments, the panel (5) can diffuse the light (11) provided by the light source (3) when the light (11) is provided proximate, adjacent to, or to a panel first edge (14).

As to particular embodiments, the panel (5) can diffuse the light (11) provided by the light source (3) when the light (11) is provided proximate, adjacent to, or to the panel second surface (13), in which case the panel (5) may be referred to as a backlit panel.

As to particular embodiments, the panel (5) can include one or more light-diffusing elements configured to diffuse the light (11) provided by the light source (3). As to particular embodiments, the light-diffusing element can be configured to diffuse the light (11) provided by the light source (3) such that the light (11) may generally uniformly illuminate the panel first surface (9) (and, as to particular embodiments, the panel second surface (13)). As to particular embodiments, the light-diffusing element can diffuse the light (11) provided by the light source (3) when the light (11) is provided proximate, adjacent to, or to one or more panel edges, for example the panel first edge (14).

As to particular embodiments, the light-diffusing element can include light-diffusing particles embedded within the panel (5), whereby the light-diffusing particles can be configured to diffuse the light (11) provided by the light source (3) such that the light (11) may generally uniformly illuminate the panel first surface (9) (and, as to particular embodiments, the panel second surface (13)).

As to particular embodiments, the light-diffusing particles can diffuse the light (11) provided by the light source (3) when the light (11) is provided proximate, adjacent to, or to one or more panel edges, such as the panel first edge (14). For example, when the light (11) is provided proximate, adjacent to, or to the panel first edge (14), the light-diffusing particles can function to deflect the light (11) and suppress total internal reflection in the panel (5), allowing the light (11) to exit the panel (5) via the panel first surface (9) (and, as to particular embodiments, the panel second surface (13)), thereby illuminating the panel first surface (9) (and, as to particular embodiments, the panel second surface (13)). As non-limiting examples, a panel (5) having light-diffusing particles which may be useful for a particular embodiment of the illuminated assembly (1) can include ACRYLITE® LED (EndLighten), which may be obtained from Evonik Cryo LLC, 299 Jefferson Road, Parsippany, N.J. 07054, USA; PLEXIGLAS® ELiT II, which may be obtained from Arkema Inc., 100 PA Rt. 413, Bristol, Pa. 19007, USA; or LUCITELUX® Light Guide Panel, which may be obtained from Lucite International Inc, 7275 Goodlett Farms Parkway, Cordova, Tenn. 38016, USA.

As to particular embodiments, the light-diffusing element can include a matrix or textured layer coupled to or integrated with the panel first surface (9) and/or the panel second surface (13), whereby the matrix or textured layer can function to illuminate the panel first surface (9) (and, as to particular embodiments, the panel second surface (13)) when the light source (3) provides light (11) to the panel (5).

As to particular embodiments, the matrix or textured layer can include a dot matrix or a dot pattern, a line matrix or a line pattern, a grid matrix or a grid pattern, a random matrix or a random pattern, or the like, or combinations thereof, which can be printed, etched, lasered, or otherwise coupled to the panel first surface (9) and/or the panel second surface (13).

As to particular embodiments, the matrix or textured layer can be configured to diffuse the light (11) provided by the light source (3) such that the light (11) may generally uniformly illuminate the panel first surface (9) (and, as to particular embodiments, the panel second surface (13)) when the light source (3) provides the light (11) proximate, adjacent to, or to one or more panel edges, such as the panel first edge (14). As non-limiting examples, a panel (5) having a matrix or textured layer coupled to the panel first surface (9) and/or the panel second surface (13) which may be useful for a particular embodiment of the illuminated assembly (1) can include PERSPEX® S-Lux, D-Lux, or PRISMEX®, which may be obtained from Lucite International Inc, 7275 Goodlett Farms Parkway, Cordova, Tenn. 38016, USA; LGP (Light Guide Panel/Plate), which may be obtained from Vivacity LED, LLC, 2830 Mary Street, Falls Church, Va. 22042, USA; or CLAREX® Light Guide Panel, which may be obtained from Astra Products, Inc., 6 Bethpage Road, Copiague, N.Y. 11726, USA.

Sheet

Now referring primarily to FIG. 2, FIG. 3D, FIG. 3E, FIG. 3G, FIGS. 5A-6C, and FIG. 9-13C, the illuminated assembly (1) can further include at least one sheet (6) coupled to the panel (5), whereby the sheet (6) can include a sheet front surface (7) opposite a sheet back surface (8). The sheet (6) can be capable of overlaying engagement with the panel (5). As to particular embodiments, the sheet back surface (8) can be capable of overlaying engagement with the panel first surface (9).

As to particular embodiments, the sheet (6) can be movably coupled to the panel (5), meaning that the sheet (6) can move in relation to the panel (5). Following, upon (i) disposition in or (ii) moving toward or to a first position (15), the sheet (6) can be in overlaying engagement with the panel (5), and/or the sheet back surface (8) can be in overlaying engagement with the panel first surface (9). Conversely, upon (i) disposition in or (ii) moving toward or to a second position (16), the sheet (6) can be in non-overlaying engagement with the panel (5) or disposed away from the panel (5), and/or the sheet back surface (8) can be in non-overlaying engagement with the panel first surface (9) or disposed away from the panel first surface (9).

Now referring primarily to FIG. 6A-6C, as to particular embodiments, the sheet (6) can be pivotally coupled to the panel (5), meaning that the sheet (6) can pivot in relation to the panel (5). For example, the sheet (6) can pivot about an axis (17). As to particular embodiments, the axis (17) can be parallel or generally parallel to a sheet edge and/or a panel edge. Following, upon (i) disposition in or (ii) pivoting toward or to a first position (15), the sheet (6) can be in overlaying engagement with the panel (5), and/or the sheet back surface (8) can be in overlaying engagement with the panel first surface (9). Conversely, upon (i) disposition in or (ii) pivoting toward or to a second position (16), the sheet (6) can be in non-overlaying engagement with the panel (5) or disposed away from the panel (5), and/or the sheet back surface (8) can be in non-overlaying engagement with the panel first surface (9) or disposed away from the panel first surface (9).

Now referring primarily to FIG. 6A-6C, as to particular embodiments, the sheet (6) can be rotatably coupled to the panel (5), meaning that the sheet (6) can rotate in relation to the panel (5). For example, the sheet (6) can rotate about an axis (17). As to particular embodiments, the axis (17) can be parallel or generally parallel to a sheet edge and/or a panel edge. Following, upon (i) disposition in or (ii) rotating toward or to a first position (15), the sheet (6) can be in overlaying engagement with the panel (5), and/or the sheet back surface (8) can be in overlaying engagement with the panel first surface (9). Conversely, upon (i) disposition in or (ii) rotating toward or to a second position (16), the sheet (6) can be in non-overlaying engagement with the panel (5) or disposed away from the panel (5), and/or the sheet back surface (8) can be in non-overlaying engagement with the panel first surface (9) or disposed away from the panel first surface (9).

As to particular embodiments, the sheet (6) can be slidably coupled to the panel (5), meaning that the sheet (6) can slide in relation to the panel (5) (not shown). Following, upon (i) disposition in or (ii) sliding toward or to a first position (15), the sheet (6) can be in overlaying engagement with the panel (5), and/or the sheet back surface (8) can be in overlaying engagement with the panel first surface (9). Conversely, upon (i) disposition in or (ii) sliding toward or to a second position (16), the sheet (6) can be in non-overlaying engagement with the panel (5) or disposed away from the panel (5), and/or the sheet back surface (8) can be in non-overlaying engagement with the panel first surface (9) or disposed away from the panel first surface (9).

The sheet (6) can be movably coupled, pivotally coupled, rotatably coupled, or slidably coupled to the panel (5) using any of a numerous and wide variety of conventional or non-conventional coupling elements, such as adhesives, mechanical fasteners, or any coupling element or method of coupling which can movably couple, pivotally couple, rotatably couple, or slidably couple the sheet (6) to the panel (5).

As to particular embodiments, the sheet (6) can be movably coupled, pivotally coupled, or rotatably coupled to the panel (5) proximate one or more sheet edges, for example a sheet first edge (18). As to particular embodiments, the sheet first edge (18) can be movably coupled, pivotally coupled, or rotatably coupled to the panel (5) proximate a panel edge.

As to particular embodiments, the sheet (6) can be movably coupled, pivotally coupled, or rotatably coupled to the panel (5) proximate only one sheet edge, for example the sheet first edge (18). As to particular embodiments, only the sheet first edge (18) can be movably coupled, pivotally coupled, or rotatably coupled to the panel (5) proximate only one panel edge.

As to particular embodiments, the sheet (6) can be movably coupled, pivotally coupled, or rotatably coupled to the panel (5) in the same fashion as or in a fashion similar to (i) the way pages of a conventional book are coupled or bound to one another, or (ii) the way a page of a conventional book is coupled or bound to a cover of the book.

The sheet (6) can be formed from any of a numerous and wide variety of materials, depending upon the embodiment. As illustrative examples, the sheet (6) can be formed from paper, a paper product, a paper-like material, plastic, fabric, metal, or the like, or combinations thereof; however, the invention need not be so limited, as the sheet (6) can be formed from any material which can couple to the panel (5) and provide a page (2) of the illuminated assembly (1).

Light Transmission Portion

Now referring primarily to FIGS. 5A-6C, and FIGS. 9-12L, the sheet (6) can include at least one light transmission portion (10) disposed within the sheet (6), whereby the light transmission portion (10) can communicate between the sheet front and back surfaces (7)(8) to provide or define a light transmission pathway (19).

Correspondingly, when the sheet (6) disposes in the first position (15) and the light source (3) is in an activated condition (4) to provide light (11) to the panel (5), the light (11) can be transmitted from the panel (5) through the light transmission portion (10) of the sheet (6) and consequently, along the light transmission pathway (19) such that the light (11) can be viewable by a viewer (12) of the sheet front surface (7).

As to particular embodiments, the light transmission portion (10) can be formed from a generally transparent material, which can allow substantially the entirety of the light (11) from the portion of the panel (5) underlaying the transparent material to be transmitted through the transparent material and correspondingly, through the sheet (6), whereby the light (11) can be viewable by a viewer (12) of the sheet front surface (7).

As to particular embodiments, the light transmission portion (10) can be formed from a generally translucent material, which can allow a portion of the light (11) from the portion of the panel (5) underlaying the translucent material to be transmitted through the translucent material and correspondingly, through the sheet (6), whereby the light (11) can be viewable by a viewer (12) of the sheet front surface (7).

Now referring primarily to FIG. 9-12L, as to particular embodiments, the light transmission portion (10) can be configured as an aperture element (20) defining an aperture element opening (21) communicating between the sheet front and back surfaces (7)(8). The aperture element opening (21) can allow a portion of the light (11) from the portion of the panel (5) underlaying the aperture element opening (21) to be transmitted through the aperture element opening (21) and correspondingly, through the sheet (6), whereby the light (11) can be viewable by a viewer (12) of the sheet front surface (7).

The aperture element (20) can define an aperture element opening (21) having any of a numerous and wide variety of configurations, depending upon the embodiment. As illustrative examples, the aperture element (20) can define an aperture element opening (21) configured as an alphabetical character, a numerical character, a shape or form (such as a shape or form corresponding to an image or the outline of an image), or the like, or combinations thereof. However, the invention need not be so limited, as the aperture element (20) can define an aperture element opening (21) having any configuration which may be useful for conveying a story, tale, narrative, lesson, or the like, described within one or more pages (2) of the illuminated assembly (1).

As to particular embodiments, the light transmission portion (10) can be formed from a combination of at least two of: a generally transparent material, a generally translucent material, and an aperture element (20).

The sheet (6), within which the one or more light transmission portions (10) are disposed, can be formed from a numerous and wide variety of materials, as described above, depending upon the embodiment. As to particular embodiments, the sheet (6) can be formed from a generally opaque material (such as a generally opaque paper or paper-like material) which precludes light transmission. Accordingly, the light (11) provided by the light source (3) to the panel (5) can only be transmitted through areas of the sheet (6) having a light transmission portion (10).

Indicium

Now referring primarily to FIG. 9-10L, as to particular embodiments, the illuminated assembly (1) can further include at least one indicium (22), such as an alphabetical character, a numerical character, a shape, a form, an image, or the like, or combinations thereof, which can be viewable via the light transmission portion (10) of the sheet (6). Particularly, when the sheet (6) disposes in the first position (15) and the light source (3) is in an activated condition (4) to provide light (11) to the panel (5), the light (11) can be transmitted from the panel (5) through the light transmission portion (10) to illuminate the indicium (22) and correspondingly, provide an illuminated indicium (22) which can be viewable by a viewer (12) of the sheet front surface (7).

As to particular embodiments, at least one indicium (22) can be coupled to or disposed on the panel (5), such as coupled to or disposed on the panel first surface (9) and/or the panel second surface (13), whereby the indicium (22) can be viewable through the light transmission portion (10) of the sheet (6) overlaying the indicium (22). For example, the indicium (22) can be viewable through an aperture element opening (21) defined by an aperture element (20) overlaying the indicium (22).

Now referring primarily to FIGS. 7A-7C, and FIGS. 9-10L, as to particular embodiments, at least one indicium (22) can be coupled to or disposed on a layer (23) coupled to the panel (5). For example, at least one indicium (22) can be coupled to or disposed on a layer (23) coupled to the panel first surface (9), whereby the layer (23) can overlay the panel first surface (9) or be in overlaying engagement with the panel first surface (9). Following, when the sheet (6) disposes in the first position (15), the layer (23) can dispose between the sheet back surface (8) and the panel first surface (9).

As to particular embodiments, at least one indicium (22) can be coupled to or disposed on a layer (23) coupled to the panel second surface (13), whereby the layer (23) can overlay the panel second surface (13) or be in overlaying engagement with the panel second surface (13).

As to particular embodiments, the layer (23) can be formed (either partially or entirely) from a generally transparent material, whereby as non-limiting examples, the transparent material can include transparency film, transparency paper, viewfoil, foil, viewgraph, or the like, which can be made from a transparent material, such as cellulose acetate.

As to other particular embodiments, the layer (23) can be formed (either partially or entirely) from a generally translucent material, whereby as non-limiting examples, the translucent material can include backlit film, backlit graphic film, duratrans, DURATRANS®, or the like.

As to particular embodiments, the layer (23) can be formed from a combination of at least two of a generally transparent material, a generally translucent material, and an opaque material.

Now referring primarily to FIG. 8A-8C, as to particular embodiments, at least one indicium (22) can be coupled to or disposed on a layer (23) coupled to the sheet (6). For example, at least one indicium (22) can be coupled to or disposed on a layer (23), whereby the layer (23) can be disposed between the sheet front surface (7) and the panel first surface (9) when the sheet (6) disposes in the first position (15).

Again referring primarily to FIG. 8A-8C, as to particular embodiments, the layer (23) can be disposed between the sheet front and back surfaces (7)(8), thus also disposing the layer (23) between the sheet front surface (7) and the panel first surface (9) when the sheet (6) disposes in the first position (15). As to these particular embodiments, the sheet (6) can be formed from two portions, which may be discrete portions coupled together whereby one of the portions provides the sheet front surface (7) and the other of the portions provides the sheet back surface (8). Correspondingly, the layer (23) can be disposed between the portions and thus between the sheet front and back surfaces (7)(8).

The layer (23) can be formed from a generally transparent material, a generally translucent material, or a combination of at least two of a generally transparent material, a generally translucent material, and an opaque material, as described above.

As but one illustrative example of an embodiment of the illuminated assembly (1) having at least one indicium (22) coupled to or disposed on a layer (23) coupled to the sheet (6), the light transmission portion (10) disposed within the sheet (6) can include an aperture element (20) and the layer (23) can be disposed between the sheet front and back surfaces (7)(8) such that the indicium (22) coupled to the layer (23) disposes within the aperture element opening (21). Following, when the sheet (6) disposes in the first position (15) and the light source (3) is in an activated condition (4) to provide light (11) to the panel (5), the light (11) can be transmitted from the panel (5) through the aperture element opening (21) and correspondingly, the layer (23), to illuminate the indicium (22) and accordingly, provide the illuminated indicium (22) which can be viewable by a viewer (12) of the sheet front surface (7).

As to particular embodiments, the illuminated assembly (1) can include a plurality of indicia (22) which can provide illuminated indicia (22), whereby the indicia (22) can be coupled to or disposed on the panel (5), on a layer (23) coupled to the panel (5), on a layer (23) coupled to the sheet (6), or combinations thereof.

As to particular embodiments, the indicia (22) which can provide illuminated indicia (22) can be formed from any of a numerous and wide variety of conventional or non-conventional inks, an illuminating ink (such as fluorescent ink, a luminescent ink, or a phosphorescent ink), or the like, or combinations thereof, for example by printing or etching.

As to particular embodiments, the illuminated assembly (1) can further include at least one indicium (22), such as an alphabetical character, a numerical character, a shape, a form, an image, or the like, or combinations thereof, coupled to or disposed on the sheet (6), such as on the sheet front and/or back surface (7)(8), for example by printing.

As to particular embodiments of the sheet (6) having a light transmission portion (10) formed from a generally transparent material or a generally translucent material, at least one indicium (22), such as an alphabetical character, a numerical character, a shape, a form, an image, or the like, or combinations thereof, can be coupled to or disposed on the light transmission portion (10), for example by printing.

Light Source

Now referring primarily to FIG. 2, FIG. 4A, FIG. 4B, FIG. 9, FIG. 11, and FIG. 13A-13C, the illuminated assembly (1) can further include a light source (3) operatively coupled to the panel (5), whereby the light source (3) in an activated condition (4) can provide light (11) to the panel (5). Following, the light (11) can be transmitted from the panel (5) through the light transmission portion (10) of the sheet (6) such that the light (11) can be viewable by a viewer (12) of the sheet front surface (7).

As to particular embodiments, the light source (3) can be coupled to the panel (5) proximate, adjacent to, or to one or more panel edges, for example the panel first edge (14). Following, the light (11) provided by the light source (3) can be provided proximate, adjacent to, or to one or more panel edges, for example the panel first edge (14).

As to particular embodiments, the light source (3) can be disposed within a recess or indentation which inwardly extends into the panel (5) from a panel edge, such that the panel (5) can provide a housing which houses the light source (3).

The light source (3) can be configured as any conventional or non-conventional light source capable of providing light (11) to the panel (5). As non-limiting examples, the light source (3) can be configured as a light-emitting diode (LED) light source, an incandescent light source, a fluorescent light source, an electroluminescent light source, a bioluminescent light source, a chemiluminescent light source, a phosphorescent light source, an ultraviolet light source, or the like, or combinations thereof.

As to particular embodiments including a light source (3) configured as an LED light source, the LED light source can include an LED, whereby the LED can be configured as surface mount device (SMD), a discrete LED, a through hole LED, a chip on board (COB) LED, or any conventional or non-conventional LED.

As to particular embodiments, the LED light source can include a plurality of LEDs, which may be discrete or combined into an array, such as a linear array on (i) a rigid or flexible strip or (ii) a rigid or flexible circuit board, such as a printed circuit board (PCB). The LEDs can be configured as side-emitting LEDs, top-emitting LEDs, or combinations thereof. As but one non-limiting example, the LED light source can be configured as a rigid or flexible strip or PCB having a linear array of side-emitting LEDs, whereby the rigid or flexible strip or PCB can operatively couple to the panel (5) proximate a panel edge such that the side-emitting LEDs orient to provide light (11) to the panel (5) proximate the panel edge.

Power Source

Now referring primarily to FIG. 2, FIG. 3C, FIG. 4A, FIG. 4B, FIG. 9, FIG. 11, and FIG. 13A-13C, the illuminated assembly (1) can further include a power source (24) operatively coupled to the light source (3) to generate an activated condition (4) in which the light source (3) can provide light (11) to the panel (5). The power source (24) can include any of a wide variety of power sources capable of powering the light source (3). As but one illustrative example, the power source (24) can be configured as a battery, whether a non-rechargeable battery or a rechargeable battery.

Now referring primarily to FIG. 2, FIG. 3D-3F, FIG. 4A, FIG. 4B, FIG. 9, FIG. 11, and FIG. 13A-13C, the illuminated assembly (1) can further include an actuator (25) coupled to the power source (24) and the light source (3). The actuator (25) can function to electrically couple the power source (24) and the light source (3) to generate an activated condition (4) of the light source (3) in which the light source (3) provides light (11) to the panel (5). Additionally, the actuator (25) can function to electrically uncouple the power source (24) and the light source (3) to generate a deactivated condition of the light source (3) in which the light source (3) does not provide light (11) to the panel (5).

Figure 3A:
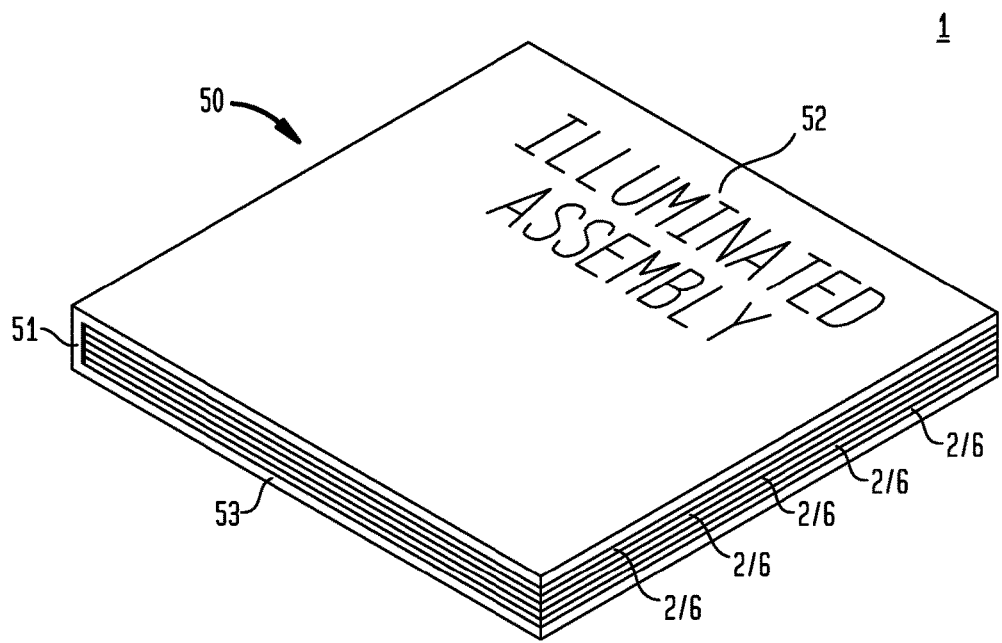
FIG. 3A is a front perspective view of a particular embodiment of the illuminated assembly.
Figure 3B:
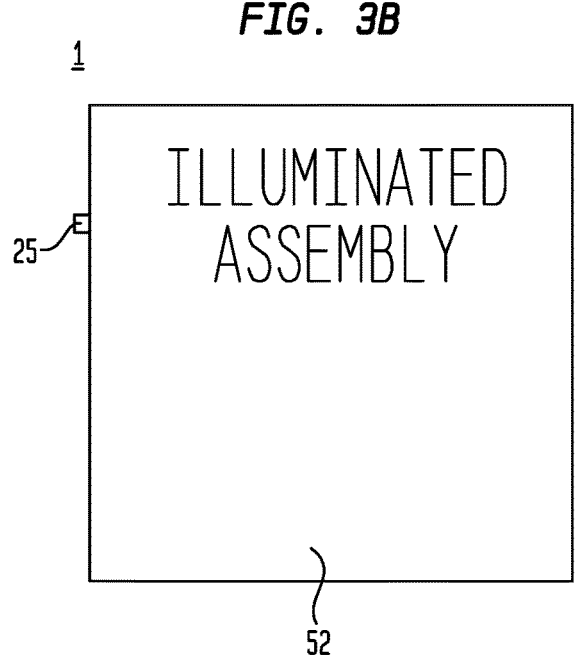
FIG. 3B is a front view of the particular embodiment of the illuminated assembly shown in FIG. 3A.
Figure 3C:
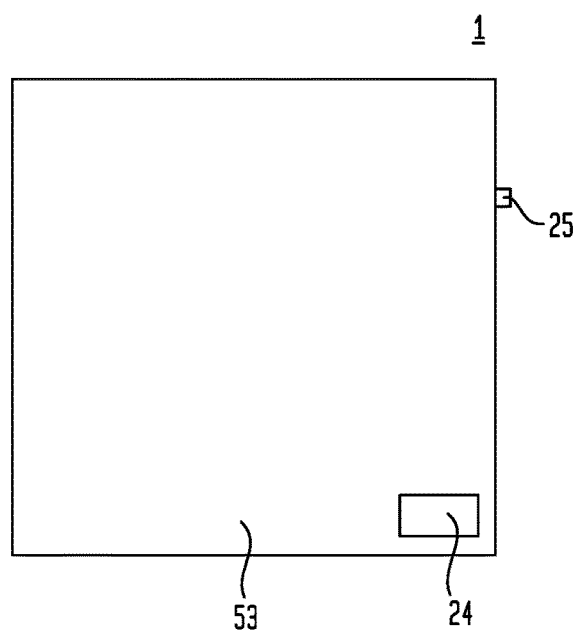
FIG. 3C is a rear view of the particular embodiment of the illuminated assembly shown in FIG. 3A.

Now referring primarily to FIG. 3D-3F, as but one illustrative example, the actuator (25) can be configured as a conventional on/off switch, such as a conventional light switch, which can electrically couple and uncouple the power source (24) and the light source (3). Accordingly, when a viewer (12) desires to illuminate a page (2) of the illuminated assembly (1), the viewer (12) can manually switch the on/off switch to an on position, thereby electrically coupling the power source (24) and the light source (3) to generate the activated condition (4) of the light source (3) to provide light (11) to the panel (5). Conversely, a viewer (12) can electrically uncouple the power source (24) and the light source (3) by manually switching the on/off switch to an off position to generate the deactivated condition of the light source (3) in which the light source (3) does not provide light (11) to the panel (5).

Plurality of Sheets

Now referring primarily to FIGS. 2-3G, and FIGS. 9-13C, as to particular embodiments, the illuminated assembly (1) can include a plurality of pages (2) operatively coupled to the light source (3) via the panel (5), whereby each page (2) can be provided by a sheet (6). Following, the illuminated assembly (1) can include a plurality of sheets (6) coupled together, whereby each sheet (6) can be configured as described above.

Correspondingly, each sheet (6) can include a sheet front surface (7) opposite a sheet back surface (8), whereby each sheet (6) can be capable of overlaying engagement with the panel (5). As to particular embodiments, each sheet's back surface (8) can be capable of overlaying engagement with the panel first surface (9).

Now referring primarily to FIG. 2, and FIG. 9-12L, as to particular embodiments, the panel (5) can dispose rearwardly or proximate the rear of the illuminated assembly (1) and the plurality of sheets (6) can dispose frontwardly or proximate the front of the illuminated assembly (1).

Now referring primarily to FIG. 13A, as to particular embodiments, the panel (5) can dispose frontwardly or proximate the front of the illuminated assembly (1) and the plurality of sheets (6) can dispose rearwardly or proximate the rear of the illuminated assembly (1).

Now referring primarily to FIG. 13C, as to particular embodiments, the panel (5) can dispose in between the plurality of sheets (6).

Now referring primarily to FIG. 10I, FIG. 10J, FIG. 12I, and FIG. 12J, as an illustrative example of a particular embodiment of the illuminated assembly (1) including a panel (5) disposed proximate the rear of the illuminated assembly (1) and five sheets (6) coupled together, a first sheet (26) disposed in the first position (15) can be in overlaying engagement with the panel (5). As to particular embodiments, a first sheet back surface (27) of the first sheet (26) can be in direct overlaying engagement with the panel first surface (9) or a layer (23) coupled to the panel first surface (9).

Now referring primarily to FIG. 10G, FIG. 10H, FIG. 12G, and FIG. 12H, continuing with the illustrative example, a second sheet (28) disposed in the first position (15) can be in overlaying engagement with the panel (5). As to particular embodiments, a second sheet back surface (29) of the second sheet (28) can be in indirect overlaying engagement with the panel first surface (9) or a layer (23) coupled to the panel first surface (9). Additionally, the second sheet (28) disposed in the first position (15) can be in overlaying engagement with the first sheet (26). As to particular embodiments, the second sheet back surface (29) can be in direct overlaying engagement with a first sheet front surface (30) of the first sheet (26). Said another way, the first sheet (26) can dispose between the second sheet (28) and the panel (5).

Now referring primarily to FIG. 10E, FIG. 10F, FIG. 12E, and FIG. 12F, continuing with the illustrative example, a third sheet (31) disposed in the first position (15) can be in overlaying engagement with the panel (5). As to particular embodiments, a third sheet back surface (32) of the third sheet (31) can be in indirect overlaying engagement with the panel first surface (9) or a layer (23) coupled to the panel first surface (9). Additionally, the third sheet (31) disposed in the first position (15) can be in overlaying engagement with the second sheet (28) and the first sheet (26). As to particular embodiments, the third sheet back surface (32) can be in direct overlaying engagement with a second sheet front surface (33) of the second sheet (28). Said another way, the second and first sheets (28)(26) can dispose between the third sheet (31) and the panel (5).

Now referring primarily to FIG. 10C, FIG. 10D, FIG. 12C, and FIG. 12D, continuing with the illustrative example, a fourth sheet (34) disposed in the first position (15) can be in overlaying engagement with the panel (5). As to particular embodiments, a fourth sheet back surface (35) of the fourth sheet (34) can be in indirect overlaying engagement with the panel first surface (9) or a layer (23) coupled to the panel first surface (9). Additionally, the fourth sheet (34) disposed in the first position (15) can be in overlaying engagement with the third sheet (31), the second sheet (28), and the first sheet (26). As to particular embodiments, the fourth sheet back surface (35) can be in direct overlaying engagement with a third sheet front surface (36) of the third sheet (31). Said another way, the third, second, and first sheets (31)(28)(26) can dispose between the fourth sheet (34) and the panel (5).

Now referring primarily to FIG. 10A, FIG. 10B, FIG. 12A, and FIG. 12B, continuing with the illustrative example, a fifth sheet (37) disposed in the first position (15) can be in overlaying engagement with the panel (5). As to particular embodiments, a fifth sheet back surface (38) of the fifth sheet (37) can be in indirect overlaying engagement with the panel first surface (9) or a layer (23) coupled to the panel first surface (9). Additionally, the fifth sheet (37) disposed in the first position (15) can be in overlaying engagement with the fourth sheet (34), the third sheet (31), the second sheet (28), and the first sheet (26). As to particular embodiments, the fifth sheet back surface (38) can be in direct overlaying engagement with a fourth sheet front surface (39) of the fourth sheet (34). Said another way, the fourth, third, second, and first sheets (34)(31)(28)(26) can dispose between the fifth sheet (37) and the panel (5).

Of course it is herein contemplated that any number of pages (2)/sheets (6) can be included in an embodiment of the illuminated assembly (1), whether it be one page (2)/sheet (6), two pages (2)/sheets (6), three pages (2)/sheets (6), four pages (2)/sheets (6), five pages (2)/sheets (6), or any number of additional pages (2)/sheets (6) which can be added in a manner similar to that described above for the illustrative example including five pages (2)/sheets (6).

Each of the plurality of sheets (6) can further include at least one light transmission portion (10) disposed therein, whereby the light transmission portion (10) can communicate between the sheet front and back surfaces (7)(8), as described above.

As to particular embodiments, each of the plurality of sheets (6) can include at least one light transmission portion (10) which can be capable of overlaying engagement with at least one light transmission portion (10) of another sheet (6).

As to particular embodiments, each of the plurality of sheets (6) can include at least one light transmission portion (10) which can be capable of overlaying engagement with at least one light transmission portion (10) of each of the other sheets (6).

Following, when at least two of the sheets (6) dispose in the first position (15), their light transmission portions (10) can be in overlaying engagement to provide aligned light transmission portions (10), whereby the aligned light transmission portions (10) can provide or define the light transmission pathway (19) between the panel (5) and the sheet front surface (7) of the outermost sheet (40).

As used herein, the "outermost sheet" means the sheet (6) of all of sheets (6) disposed in the first position (15) which disposes farthest from the panel (5) and/or the panel first surface (9). As to particular embodiments, the outermost sheet (40) can be the frontmost sheet or the sheet (6) of all of sheets (6) disposed in the first position (15) which disposes closest to the front of the illuminated assembly (1). Correspondingly, the sheet (6) of all the sheets (6) disposed in the first position (15) which disposes closest to the panel (5) and/or the panel first surface (9) can be referred to as the innermost sheet (41). As to particular embodiments, the innermost sheet (41) can be the rearmost sheet or the sheet (6) of all of sheets (6) disposed in the first position (15) which disposes closest to the rear of the illuminated assembly (1).

Following, when the sheets (6) dispose in the first position (15) and the light source (3) is in an activated condition (4) to provide light (11) to the panel (5), the light (11) can be transmitted from the panel (5) through the aligned light transmission portions (10) and along the light transmission pathway (19) such that the light (11) can be viewable by a viewer (12) of the sheet front surface (7) of the outermost sheet (40).

Now referring primarily to FIG. 9-12L, continuing with the above-described illustrative example of a particular embodiment of the illuminated assembly (1) including a panel (5) disposed proximate the rear of the illuminated assembly (1) and five sheets (6) coupled together, each sheet (26)(28)(31)(34)(37) can include at least one light transmission portion (10) which can be capable of overlaying engagement with at least one light transmission portion (10) of each of the other sheets (6). Within the illuminated assembly (1), the first sheet (26) can be the innermost sheet (41) which disposes closest to the panel (5) and/or the panel first surface (9) when in the first position (15). The second sheet (28) can dispose next to the first sheet (26), whereby the first sheet (26) can dispose between the second sheet (28) and the panel (5) and/or the panel first surface (9). The third sheet (31) can dispose next to the second sheet (28), whereby the second sheet (28) can dispose between the third sheet (31) and the first sheet (26). The fourth sheet (34) can dispose next to the third sheet (31), whereby the third sheet (31) can dispose between the fourth sheet (34) and the second sheet (28). The fifth sheet (37) can dispose next to the fourth sheet (34), whereby the fourth sheet (34) can dispose between the fifth sheet (37) and the third sheet (31). In this particular example including these five sheets (26)(28)(31)(34)(37) coupled together, the fifth sheet (37) can be the outermost sheet (40) which disposes farthest from the panel (5) and/or the panel first surface (9) when in the first position (15).

Now referring primarily to FIG. 10I, FIG. 10J, FIG. 12I, and FIG. 12J, continuing with the illustrative example, when the first sheet (26) disposes in the first position (15) and the second, third, fourth, and fifth sheets (28)(31)(34)(37) dispose in the second position (16), the first sheet (26) can be the outermost sheet (40). Thus, when the light source (3) is in an activated condition (4) to provide light (11) to the panel (5), the light (11) can be transmitted from the panel (5) through the first sheet light transmission portion (42) and consequently, along the light transmission pathway (19) such that the light (11) can be viewable by a viewer (12) of the first sheet front surface (30).

Now referring primarily to FIG. 10G, FIG. 10H, FIG. 12G, and FIG. 12H, continuing with the illustrative example, when the first and second sheets (26)(28) dispose in the first position (15) and the third, fourth, and fifth sheets (31)(34)(37) dispose in the second position (16), the second sheet (28) can be the outermost sheet (40). In this configuration, the first and second sheet light transmission portions (42)(43) can be in overlaying engagement to provide aligned light transmission portions (10) and correspondingly, a light transmission pathway (19) between the panel (5) and the second sheet front surface (33). Thus, when the light source (3) is in an activated condition (4) to provide light (11) to the panel (5), the light (11) can be transmitted from the panel (5) through the aligned first and second sheet light transmission portions (42)(43) and consequently, along the light transmission pathway (19) such that the light (11) can be viewable by a viewer (12) of the second sheet front surface (33).

Now referring primarily to FIG. 10E, FIG. 10F, FIG. 12E, and FIG. 12F, continuing with the illustrative example, when the first, second, and third sheets (26)(28)(31) dispose in the first position (15) and the fourth and fifth sheets (34)(37) dispose in the second position (16), the third sheet (31) can be the outermost sheet (40). In this configuration, the first, second, and third sheet light transmission portions (42)(43)(44) can be in overlaying engagement to provide aligned light transmission portions (10) and correspondingly, a light transmission pathway (19) between the panel (5) and the third sheet front surface (36). Thus, when the light source (3) is in an activated condition (4) to provide light (11) to the panel (5), the light (11) can be transmitted from the panel (5) through the aligned first, second, and third sheet light transmission portions (42)(43)(44) and consequently, along the light transmission pathway (19) such that the light (11) can be viewable by a viewer (12) of the third sheet front surface (36).

Now referring primarily to FIG. 10C, FIG. 10D, FIG. 12C, and FIG. 12D, continuing with the illustrative example, when the first, second, third, and fourth sheets (26)(28)(31)(34) dispose in the first position (15) and the fifth sheet (37) disposes in the second position (16), the fourth sheet (34) can be the outermost sheet (40). In this configuration, the first, second, third, and fourth sheet light transmission portions (42)(43)(44)(45) can be in overlaying engagement to provide aligned light transmission portions (10) and correspondingly, a light transmission pathway (19) between the panel (5) and the fourth sheet front surface (39). Thus, when the light source (3) is in an activated condition (4) to provide light (11) to the panel (5), the light (11) can be transmitted from the panel (5) through the aligned first, second, third, and fourth sheet light transmission portions (42)(43)(44)(45) and consequently, along the light transmission pathway (19) such that the light (11) can be viewable by a viewer (12) of the fourth sheet front surface (39).

Now referring primarily to FIG. 10A, FIG. 10B, FIG. 12A, and FIG. 12B, continuing with the illustrative example, when the first, second, third, fourth, and fifth sheets (26)(28)(31)(34)(37) dispose in the first position (15), the fifth sheet (37) can be the outermost sheet (40). In this configuration, the first, second, third, fourth, and fifth sheet light transmission portions (42)(43)(44)(45)(46) can be in overlaying engagement to provide aligned light transmission portions (10) and correspondingly, a light transmission pathway (19) between the panel (5) and a fifth sheet front surface (47). Thus, when the light source (3) is in an activated condition (4) to provide light (11) to the panel (5), the light (11) can be transmitted from the panel (5) through the aligned first, second, third, fourth, and fifth sheet light transmission portions (42)(43)(44)(45)(46) and consequently, along the light transmission pathway (19) such that the light (11) can be viewable by a viewer (12) of the fifth sheet front surface (47).

Of note, FIG. 10K, FIG. 10L, FIG. 12K, and FIG. 12L shows the first, second, third, fourth, and fifth sheets (26)(28)(31)(34)(37) disposed in the second position (16) and correspondingly, the first, second, third, fourth, and fifth sheets (26)(28)(31)(34)(37) can be in non-overlaying engagement with the panel (5) or disposed away from the panel (5) and the layer (23) overlaying the panel first surface (9) such that an entirety of the layer (23) can be viewable by a viewer (12) of the front surface of the layer (23).

As to particular embodiments, one or more of the plurality of sheets (6) can include at least one light transmission portion (10) which can be capable of being at least partially obscured by another sheet (6).

Following, when at least two of the sheets (6) dispose in the first position (15), the innermore or rearmore sheet can include at least one light transmission portion (10) which can be at least partially obscured an outermore or frontmore sheet.

Now referring primarily to FIG. 13B, as to particular embodiments, the illuminated assembly (1) can include a plurality of panels (5) and a plurality of sheets (6). As but one non-limiting example, the illuminated assembly (1) can include a first panel (48) disposed proximate the rear of the illuminated assembly (1) and a second panel (49) disposed proximate the front of the illuminated assembly (1), whereby the plurality of sheets (6) can be disposed between the first and second panels (48)(49). Following, a sheet back surface (8) of one of more of the sheets (6) can be capable of overlaying engagement with a panel first surface (9) of the first panel (48), and a sheet front surface (7) of one of more of the sheets (6) can be capable of overlaying engagement with a panel first surface (9) of the second panel (49). Accordingly, the first panel (48) can provide light (11) which can be viewable by a viewer (12) of a sheet front surface (7) of one or more of the sheets (6), and the second panel (49) can provide light (11) which can be viewable by a viewer (12) of a sheet back surface (8) of one or more of the sheets (6).

Now referring primarily to FIG. 9-10L, as to particular embodiments, the light transmission portions (10) in overlaying engagement to provide aligned light transmission portions (10) and correspondingly, a light transmission pathway (19), can have the same or a similar perimeter and correspondingly, the same or a similar area.

Now referring primarily to FIG. 11-12L, as to particular embodiments, the light transmission portions (10) in overlaying engagement to provide aligned light transmission portions (10) and correspondingly, a light transmission pathway (19), can have differing perimeters and correspondingly, differing areas. As a non-limiting example, the perimeters and/or areas of the light transmission portions (10) can increase or be progressively greater/larger from the outermost sheet (40) to the innermost sheet (41). Said another way, the perimeters and/or areas of the light transmission portions (10) can decrease or be progressively lesser/smaller from the innermost sheet (41) to the outermost sheet (40).

Cover

Now referring primarily to FIGS. 2-3G, and FIGS. 13A-13C, the illuminated assembly (1) can further include a cover (50) coupled to the panel (5) and the sheets (6), whereby the cover (50) can (i) cover at least a portion of the panel (5) and the sheets (6), and (ii) provide an embodiment of the illuminated assembly (1) as a solitary construct. As to particular embodiments, the cover (50) can include a spine (51) coupled between front and rear cover elements (52)(53).

As to particular embodiments, the sheets (6) disposed between the front and rear cover elements (52)(53) can be coupled together in the same fashion as or in a fashion similar to the way pages of a conventional book are coupled or bound to one another.

As to particular embodiments, the sheets (6) can be coupled to the cover (50) in the same fashion as or in a fashion similar to the way pages of a conventional book are coupled or bound to a cover of the book.

As to particular embodiments, the panel (5) can be (i) coupled to, (ii) integrated with, or (iii) incorporated into a page (2) of the illuminated assembly (1).

As to particular embodiments, the panel (5) can be (i) coupled to, (ii) integrated with, or (iii) incorporated into the cover (50).

As to particular embodiments, the panel (5) can be coupled to or disposed in the front cover element (52).

As to particular embodiments, the panel (5) can be coupled to or disposed in the rear cover element (53).

As to particular embodiments, a panel (5) can be coupled to or disposed in each of the front and rear cover elements (52)(53).

As to particular embodiments, the light source (3) can be (i) coupled to, (ii) integrated with, or (iii) incorporated into the cover (50).

As to particular embodiments, the light source (3) can be coupled to or disposed in the front cover element (52).

As to particular embodiments, the light source (3) can be coupled to or disposed in the rear cover element (53).

As to particular embodiments, a light source (3) can be coupled to or disposed in each of the front and rear cover elements (52)(53).

As to particular embodiments, the illuminated assembly (1) can comprise a book or be configured as a book, whereby the book can be similar to a conventional book except for, of course, at least the addition of the panel (5) and the light source (3), whereby the light source (3) in an activated condition (4) can illuminate at least a portion of one or more pages (2) of the book via the panel (5). Additionally, the illuminated assembly (1) includes at least one sheet (6) having at least one light transmission portion (10) disposed therein, which can also differentiate an embodiment of the illuminated assembly (1) configured as a book from a conventional book.

As to particular embodiments, the illuminated assembly (1) can further include one or more position sensors, which can sense a position of one or more of the panel (5), the sheet(s) (6), the front cover element (52), the rear cover element (53), or any movable component of the illuminated assembly (1) to activate the light source (3) to an activated condition (4) in response to the movement of one or more movable components of the illuminated assembly (1). As but one illustrative example, when the front cover element (52) of the illuminated assembly (1) is moved to provide an open condition of the illuminated assembly (1), the position sensor can sense the movement of the front cover element (52) and accordingly provide an activation signal to the light source (3), the power source (24), the actuator (25), or the like, to generate the activated condition (4), whereby the light source (3) provides light (11) to the panel (5).

Now regarding production, a method of making a particular embodiment of the illuminated assembly (1) can include coupling at least one sheet (6) to a panel (5) such that the sheet (6) can be capable of overlaying engagement with the panel (5), and operatively coupling a light source (3) to the panel (5). As described above, the sheet (6) can include at least one light transmission portion (10) communicating between sheet front and back surfaces (7)(8). The light source (3) in an activated condition (4) can provide light (11) to the panel (5), whereby the light (11) can be transmitted from the panel (5) through the light transmission portion (10) of the sheet (6) such that the light (11) can be viewable by a viewer (12) of the sheet front surface (7).

The method of making particular embodiments of the illuminated assembly (1) can further include providing additional components of the illuminated assembly (1) as described above and in the claims.

As can be easily understood from the foregoing, the basic concepts of the present invention may be embodied in a variety of ways. The invention involves numerous and varied embodiments of an illuminated assembly and methods for making and using such an illuminated assembly.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or a method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in Merriam-Webster's Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about", it will be understood that the particular value forms another embodiment. The term "about" generally refers to a range of numeric values that one of skill in the art would consider equivalent to the recited numeric value or having the same function or result. Similarly, the antecedent "substantially" or "generally" means largely, but not wholly, the same form, manner or degree and the particular element will have a range of configurations as a person of ordinary skill in the art would consider as having the same function or result. When a particular element is expressed as an approximation by use of the antecedent "substantially" or "generally", it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant should be understood to claim at least: (i) each embodiment of the illuminated assembly herein disclosed and described, (ii) the related methods disclosed and described, (iii) similar, equivalent, and even implicit variations of each of these apparatuses and methods, (iv) those alternative embodiments which accomplish each of the functions shown, disclosed, or described, (v) those alternative designs and methods which accomplish each of the functions shown as are implicit to accomplish that which is disclosed and described, (vi) each feature, component, and step shown as separate and independent inventions, (vii) the applications enhanced by the various systems or components disclosed, (viii) the resulting products produced by such systems or components, (ix) methods and apparatuses substantially as described hereinbefore and with reference to any of the accompanying examples, and (x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of embodiments of the invention and are not to be construed as the broadest embodiment of the invention or a complete listing of embodiments of the invention that may be claimed. The applicant does not waive any right to develop further claims based upon the description set forth above or in the drawings as a part of any continuation, division, continuation-in-part, or similar application.

The invention claimed is:

1. An illuminated assembly comprising:
a panel comprising a panel first surface;
at least one sheet movably coupled to said panel, said sheet capable of overlaying engagement with said panel;
wherein said sheet comprises:
a sheet front surface opposite a sheet back surface; and
at least one light transmission portion disposed within said sheet, said light transmission portion communicating between said sheet front and back surfaces; and
a light source operatively coupled to said panel;
wherein upon overlaying engagement of said sheet with said panel, said panel first surface disposes in generally parallel relation to said sheet back surface;
wherein said light source in an activated condition provides light to said panel first surface; and
wherein said light is transmitted from said panel first surface through said light transmission portion such that said light is viewable by a viewer of said sheet front surface.

2. The illuminated assembly of claim 1, wherein said panel comprises a panel first surface;
wherein said light source in an activated condition provides light to said panel first surface; and
wherein said light is transmitted from said panel first surface through said light transmission portion such that said light is viewable by said viewer of said sheet front surface.

3. The illuminated assembly of claim 1, wherein said panel comprises a light-diffusing panel configured to diffuse said light provided by said light source.

4. The illuminated assembly of claim 3, wherein said panel diffuses said light provided by said light source when said light is provided proximate a panel edge of said panel.

5. The illuminated assembly of claim 1, wherein said light transmission portion comprises a generally transparent material.

6. The illuminated assembly of claim 1, wherein said light transmission portion comprises a generally translucent material.

7. The illuminated assembly of claim 1, further comprising at least one indicium viewable via said light transmission portion.

8. The illuminated assembly of claim 7, wherein when said light is transmitted from said panel through said light transmission portion, said indicium is illuminated to provide an illuminated indicium which is viewable by said viewer of said sheet front surface.

9. The illuminated assembly of claim 8, further comprising a layer coupled to said panel;
wherein said indicium is disposed on said layer.

10. The illuminated assembly of claim 9, wherein said layer overlays a panel first surface of said panel.

11. The illuminated assembly of claim 10, wherein said layer comprises a translucent material.

12. The illuminated assembly of claim 1, wherein said light source is coupled to said panel proximate a panel edge.

13. The illuminated assembly of claim 1, further comprising a plurality of sheets coupled to said panel.

14. The illuminated assembly of claim 13, wherein each said sheet comprises at least one said light transmission portion which is capable of overlaying engagement with at least one said light transmission portion of another said sheet.

15. The illuminated assembly of claim 13, wherein each said sheet comprises at least one said light transmission portion which is capable of overlaying engagement with at least one said light transmission portion of each of the other said sheets.

16. The illuminated assembly of claim 15, wherein when said sheets dispose in a first position, said light transmission portions dispose in overlaying engagement to provide aligned light transmission portions.

17. The illuminated assembly of claim 13, further comprising a cover coupled to said panel and said sheets.

18. The illuminated assembly of claim 17, wherein said panel is incorporated into said cover.

19. The illuminated assembly of claim 1, wherein said illuminated assembly comprises a book.

* * * * *